US 9,959,689 B2

(12) United States Patent
Pulitzer

(10) Patent No.: US 9,959,689 B2
(45) Date of Patent: May 1, 2018

(54) SYSTEM AND METHOD FOR CREATION OF UNIQUE IDENTIFICATION FOR USE IN GATHERING SURVEY DATA FROM A MOBILE DEVICE AT A LIVE EVENT

(71) Applicant: FEVR TECH, LLC, Jackson, WY (US)

(72) Inventor: Jovan Hutton Pulitzer, Frisco, TX (US)

(73) Assignee: TESLA LABORATORIES LLC, Jackson, WY (US)

( * ) Notice: Subject to any disclaimer, the term of this patent is extended or adjusted under 35 U.S.C. 154(b) by 0 days. days.

(21) Appl. No.: 15/146,464

(22) Filed: May 4, 2016

(65) Prior Publication Data
US 2017/0148238 A1 May 25, 2017

Related U.S. Application Data

(60) Provisional application No. 62/258,988, filed on Nov. 23, 2015, provisional application No. 62/258,982, filed on Nov. 23, 2015, provisional application No. 62/258,983, filed on Nov. 23, 2015, provisional application No. 62/258,985, filed on Nov. 23, 2015, provisional application No. 62/258,987, filed on Nov. 23, 2015.

(51) Int. Cl.
| G06Q 40/00 | (2012.01) |
| G07C 9/00 | (2006.01) |
| G06F 17/30 | (2006.01) |
| G06Q 10/02 | (2012.01) |
| H04L 12/26 | (2006.01) |

(52) U.S. Cl.
CPC ..... *G07C 9/00015* (2013.01); *G06F 17/30879* (2013.01); *G06Q 10/02* (2013.01); *H04L 43/106* (2013.01)

(58) Field of Classification Search
CPC ............ G06C 30/0241; G06C 30/0242; G06C 30/0275
USPC ................................... 235/379, 385
See application file for complete search history.

(56) References Cited

U.S. PATENT DOCUMENTS 5,226,177 A 7/1993 Nickerson
5,273,437 A 12/1993 Caldwell
(Continued)

OTHER PUBLICATIONS

PCT: International Search Report and Written Opinion of PCT/US16/31015; Aug. 23, 2016 Aug. 23, 2016.

*Primary Examiner* — Seung Lee
(74) *Attorney, Agent, or Firm* — Howison & Arnott, LLP

(57) ABSTRACT

A method is provided for interacting with audience members in an event, each of the potential attendees having available thereto a unique identifier. The method comprises creating, for an attendee, a unique ID (UID) on a mobile wireless device (MWD) by the steps of inputting to the MWD one of the unique identifiers, combining the obtained unique identifier with a UID time stamp at the time of creation of the UID; receiving with a server on a first wireless channel communications from the MWD; registering the UID at the physical location of the event; generating a visual query; displaying on the MWD response indicators; receiving at the server from the registered attendee a response, to the query over the first wireless channel; and storing in a database on the server the received response in association with the displayed query.

17 Claims, 19 Drawing Sheets

(56) References Cited

U.S. PATENT DOCUMENTS

| | | | |
|---|---|---|---|
| 5,801,754 | A | 9/1998 | Ruybal |
| 5,993,314 | A | 11/1999 | Dannenberg |
| 6,760,595 | B2 | 7/2004 | Inselberg |
| 8,229,093 | B2 | 7/2012 | Martin |
| 8,391,825 | B2 | 3/2013 | Arseneau |
| 8,417,221 | B2 * | 4/2013 | Shaw .................. H04L 12/5895 455/412.1 |
| 9,160,692 | B2 | 10/2015 | Socolof |
| 2004/0158865 | A1 | 8/2004 | Kubler et al. |
| 2007/0028272 | A1 | 2/2007 | Lockton |
| 2007/0112648 | A1 | 5/2007 | Martin |
| 2010/0306064 | A1 * | 12/2010 | Inselburg ........... G06Q 30/0241 705/14.71 |
| 2011/0028213 | A1 | 2/2011 | Dusenberry |
| 2011/0271295 | A1 | 11/2011 | Redmann et al. |

* cited by examiner

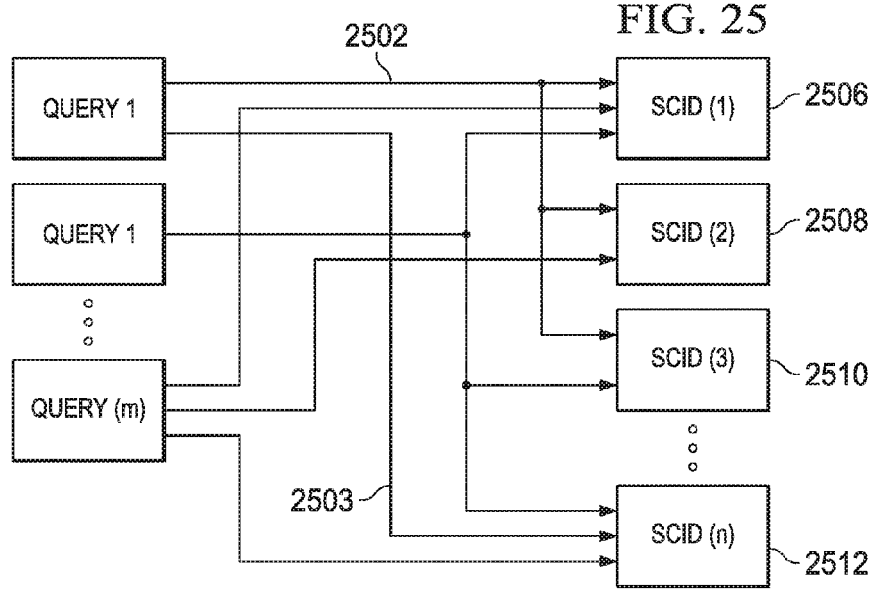
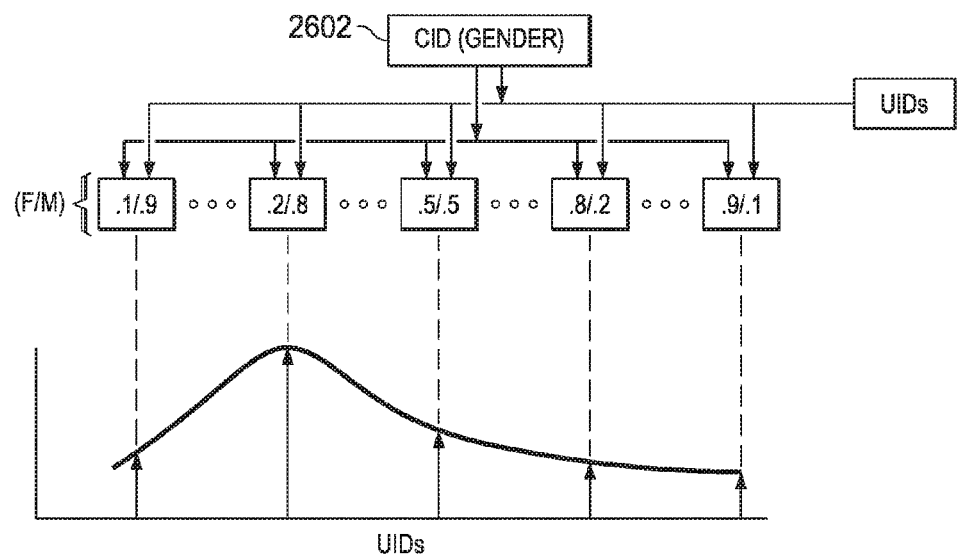

US 9,959,689 B2

SYSTEM AND METHOD FOR CREATION OF UNIQUE IDENTIFICATION FOR USE IN GATHERING SURVEY DATA FROM A MOBILE DEVICE AT A LIVE EVENT

CROSS-REFERENCE TO RELATED APPLICATIONS

This application claims priority to U.S. Provisional Application No. 62/258,988, filed on Nov. 23, 2015, entitled SYSTEM AND METHOD FOR EXTRAPOLATING STATISTICAL DATA GENERATED FROM A MOBILE DEVICE AT A LIVE EVENT, which is incorporated by reference herein in its entirety. This application also claims priority to U.S. Provisional Application No. 62/258,982, filed on Nov. 23, 2015, entitled SYSTEM AND METHOD FOR CREATION OF UNIQUE IDENTIFICATION FOR USE IN GATHERING SURVEY DATA FROM A MOBILE DEVICE AT A LIVE EVENT, which is incorporated by reference herein in its entirety. This application also claims priority to U.S. Provisional Application No. 62/258,983, filed on Nov. 23, 2015, entitled METHOD FOR TRACKING ATTENDEE PARTICIPATION IN USING A SOFTWARE APPLICATION AT A LIVE EVENT, which is incorporated by reference herein in its entirety. This application also claims priority to U.S. Provisional Application No. 62/258,985, filed on Nov. 23, 2015, entitled SYSTEM AND METHOD FOR USING A MOBILE DEVICE AS AN INPUT DEVICE FOR SURVEYS AT A LIVE EVENT, which is incorporated by reference herein in its entirety. This application also claims priority to U.S. Provisional Application No. 62/258,987, filed on Nov. 23, 2015, entitled SYSTEM AND METHOD FOR FACILITATING A PURCHASE USING CARRIER INFORMATION FOR A MOBILE DEVICE, which is incorporated by reference herein in its entirety.

TECHNICAL FIELD

The following disclosure relates to generally to the interface between advertisers, media companies, leagues, sponsors, underwriters, partners and media partners, leagues, teams, franchises, sponsors, underwriters, media partners, conferences, venue specific messengers, and championships, as well as a target audience, and collecting statistics relating thereto.

BACKGROUND

When advertisers, media companies, leagues, sponsors, underwriters, partners and media partners, leagues, teams, franchises, sponsors, underwriters, media partners, conferences, venue specific messengers, and championships ("the messenger") distribute their advertising with respect to a particular venue, it is important that they have some type of feedback as to the effectiveness of these advertisements. The main problem that exists today in certain venues is that the advertisement is displayed on a screen at, for example, a football game, and it is expected that a certain portion of the attendees are viewing the screen. However, some attendees may have left their seats and gone for refreshments or they may actually, in the current environment, the occupied with their mobile devices. As such, it is difficult for an advertiser to have any feedback as to the "effectiveness" of a particular advertisement at reaching the eyes of the attendees.

BRIEF DESCRIPTION OF THE DRAWINGS

For a more complete understanding, reference is now made to the following description taken in conjunction with the accompanying Drawings in which:

FIG. 25 illustrates a diagrammatic view of the mapping of queries to SCIDs;

FIG. 27 illustrates a diagrammatic view of one particular statistical spread over multiple queries presented throughout an event at a liver performance within a given venue.

DETAILED DESCRIPTION

Figure 1:
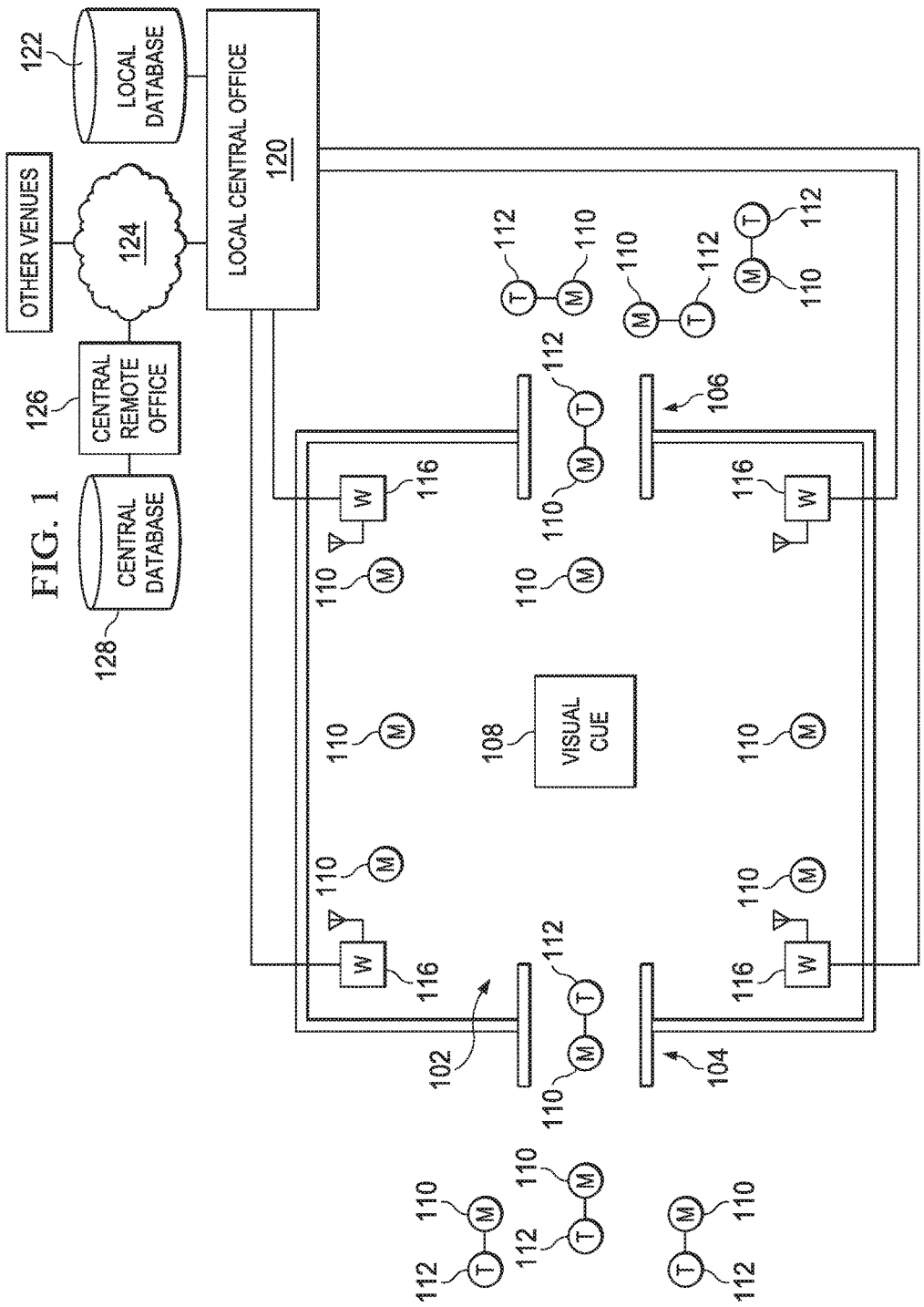
FIG. 1 illustrates an overall diagrammatic view of a venue utilizing a disclosed embodiment.

Referring now to FIG. 1, there is illustrated a diagrammatic view of the overall operation at a particular venue utilizing the disclosed embodiment. In this illustration, there is illustrated a single venue 102, such as a football stadium, a concert hall, or anything that requires a ticket to grant entrance thereto and also provide some type of seating chart such that each ticket holder has a defined seat associated therewith or assigned thereto. This venue 102 has provided therefore, by example, two gates 104 and 106. In the center of the venue 102 or disposed throughout the venue 102 there is provided some type of visual/audio interfaced 108. Throughout the following description, this will typically be referred to as a visual interface providing a visual cue of some sort. However, it should be understood that the cue is some type of information that can be transmitted from one or more locations within the venue 102 in the form of a video or an audio cue or some type of cue that can be sensed by an attendee. Although this visual cue 108 is illustrated as being in the center of the venue 102, it should be understood that it can be located at different locations throughout the venue 102. Additionally, the visual cue from multiple locations could all be the same cue, or it could actually be different cues.

There are illustrated a plurality of Mobile Units 110 labeled "M" which will be referred to hereinafter by the terminology "MU" 110. Each of these MUs 110 is associated with an individual, and that individual has associated therewith a ticket, this ticket referred to by a reference numeral 112. The only MUs that are illustrated as having a ticket 112 associated therewith are those that are entering the gate 104 or the gate 106. Each of these MUs 110 has the ability to communicate via a wireless link to one of the plurality of wireless network receivers 116 disposed throughout the venue 102. These wireless network receivers provide substantially full coverage around the venue 102, and each of the wires receivers 116 are connected directly to a local central office 120 (CO) which basically has a computer that is interfaced with a local database 122. This database 122 and local central office 120 are connected through a global network 124 (Internet) to a central remote office 126, which has associated therewith a central database 126.

The wireless receivers can be any type of wireless receiver network, for example, a Wi-Fi-based network. However, it should be understood that any other type of network could be utilized. Each of these wireless receivers 116 has associated therewith a unique ID in the form of an SSID that can be recognized by the MU 110 and, once a communication link is effected between the MU 110 and the wireless receiver 116, a physical location can be established with respect to the physical location of the venue 102. Since the local central office 120 is aware of its location and it is connected directly to the wireless receivers 116, the location of the venue 102 can be associated with any data in the local database 122. This allows any data associated with the local database 122 to also be associated with any information collected from attendees at the event occurring in the venue 102.

Additionally, the wireless interface between each of the MUs 110 and the local central office 120 could be effected with a mesh network. The communication protocol could use a Zigbee network, a Thread network, or any type of network that allows data to actually be transmitted to a master station to be transferred from one MU 110 to another MU 110.

In the overall operation, as will be described hereinbelow, a particular user will enter the venue 102 and initiate an application on their associated MU 110 which will create a unique ID (UID) associated with that particular device at that particular time based upon information contained on their individual ticket which will also identify the seat to which they are assigned. The user will then provide a response of some sort to possibly a visual cue received locally and send the UID and response to the local CO 120. This will result in a registration of that particular device with the local CO 120. Thereafter, visual cues are displayed on the display 108 with choices. These choices are associated with preset choice buttons on the MU 110 that, when selected, provide responses that are utilized by the local CO 120 for collecting statistics on the attendees.

Figure 2:
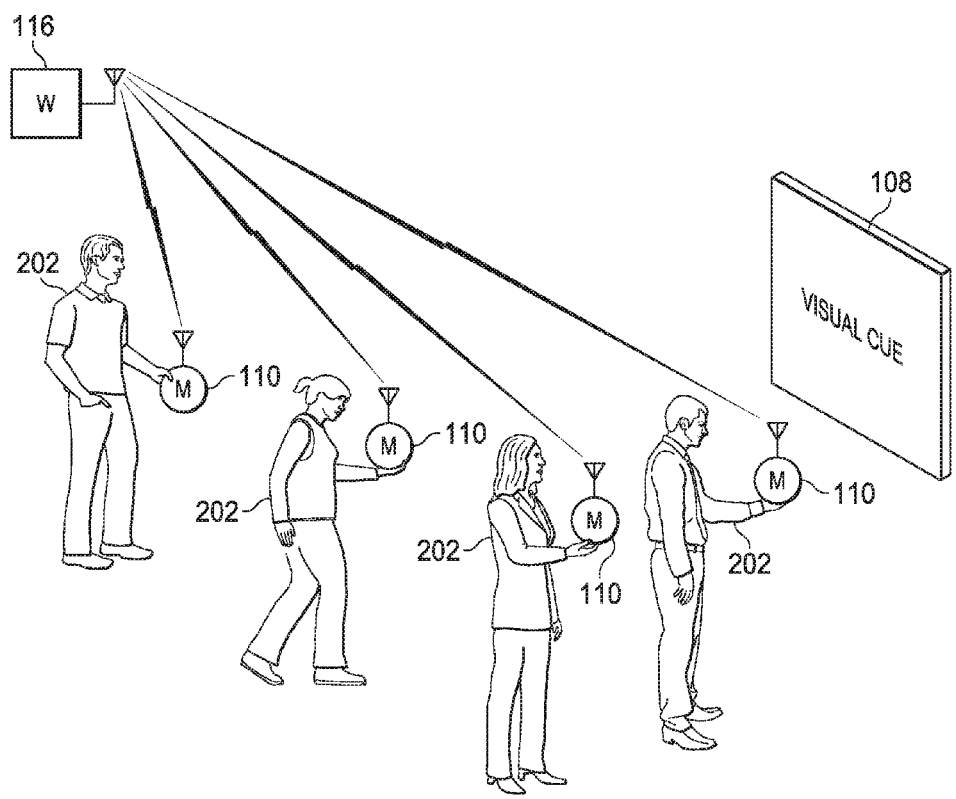
FIG. 2 illustrates a diagrammatic view of multiple attendees interfaced with a screen on which advertisements are presented.

Referring now to FIG. 2, there is illustrated a diagrammatic view of a plurality of individuals 202 with their associated MUs 110. The display 108 is illustrated as providing a visual cue in the form of some type of program, advertisement or the such that will be followed with or associated with a visual cue that, if the individual 102 is viewing the screen and is paying attention to the advertisement, will be enticed to actually make a selection and, upon making a selection, this selection or responses sent back via the wireless receiver 116 two the local CO 120.

Figure 3:
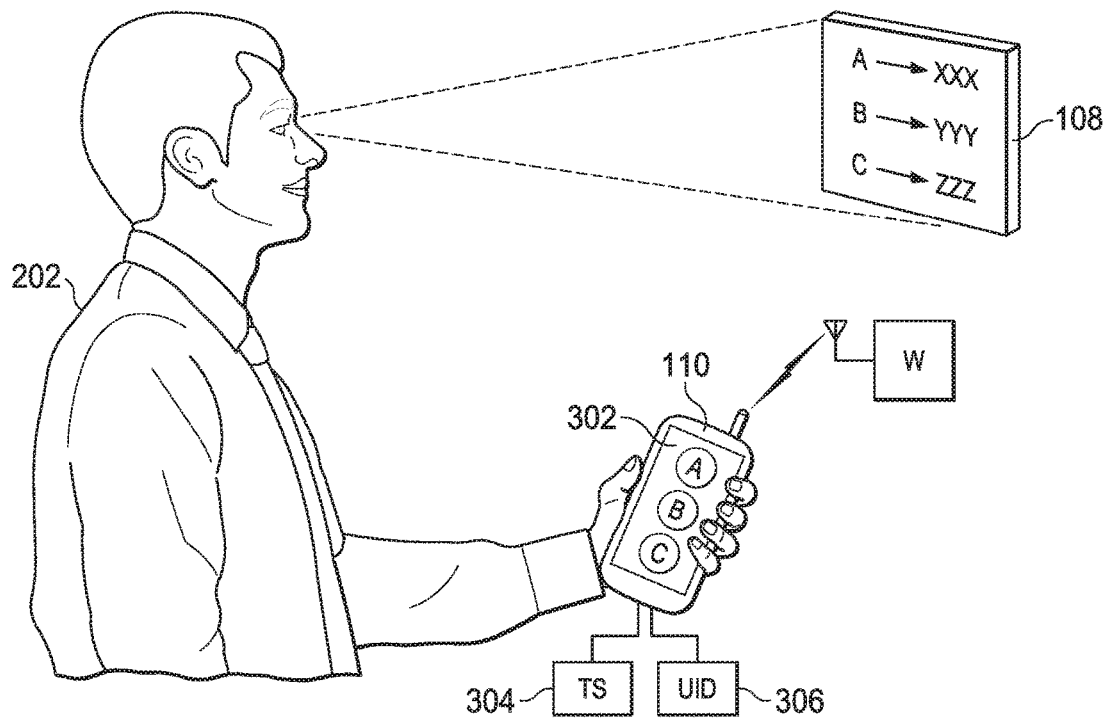
FIG. 3 illustrates a view of a single attendee interfacing with the screen and choices provided thereon and their mobile units and the selections provided thereon.

Referring now to FIG. 3, there is illustrated a diagrammatic view of a single individual presented with three responses on the display 108, these being illustrated as the letter A, the letter B, and the letter C. Each of these is associated with some type of information which allows the individual 202 to discern these particular choices. They may be some type of contest providing different selections. It may be that the particular cue requires a single response just to indicate that the user is paying attention to the screen. For example, it could be a contest that allows a responder the possibility of entering a contest, i.e., "press A on your device to enter your seat number in a lottery to win a certain prize." The MU 110 is provided thereon a screen 302 having those three selected letters available for choices. By placing their finger over one of the selections, the user creates a response that is then combined with a timestamp 304 and the created UID 306 back to the local CO 120 for processing thereof. It should be understood that, once the UID is created by the MU 110, this is now a UID that is carried temporarily in the MU 110 until the MU 110 either leaves the venue 102 or there is some type of timeout period of, for example, two hours.

The result of this overall operation is that a device, once entering the gate and initiating the application, creates a UID on the device that defines that device in a local database. Thereafter, any response can be correlated with the query in the substance of that query as long as the response is sent within a particular time window. For example, a query would be transmitted to the attendees and, during the transmission or slightly thereafter, there is a defined time window within which a response must be made. As such, even though the button associated with the letter A is selected for different queries, it is easy to discriminate in the database what information that particular response was associated with.

Figure 4:
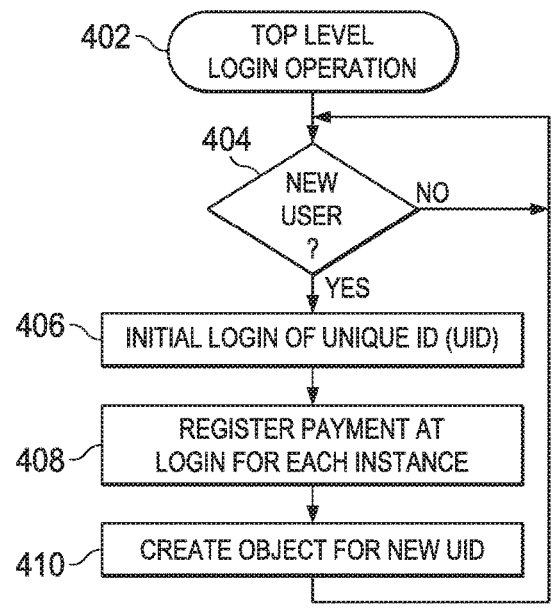
FIG. 4 illustrates a flowchart depicting the top level login operation.

Referring now to FIG. 4, there is illustrated a flowchart of the top level login operation, which is initiated at a block 402. This then proceeds to a decision block 404 to determine if a new user has entered the system. This is typically determined at the gate when the user passes through the gate or when an application is initiated. This may also be determined when a user answers an initial query, in addition to providing the user's seat number. If it is indicated that a new user is present, the program proceeds along a "Y" path to a block 406 to login an initial unique ID (UID) for that device. The program then proceeds to a function block 408 in order to register payment at the login event for each instance of a device passing through the gate or initiating their application. This payment operation will be described in more detail but, in general, the way that revenue is collected on this particular overall operation is that a flat fee is provided for each device that is registered for a particular event. The flat fee may be for any value. Thereafter, all of the data collected, whether the data is voluminous or not is immaterial to the overall revenue-generating model. Thus, then a defined amount of money can be collected depending upon the number of attendees while the advertisement level or volume has no effect on the overall revenue model. However, data is, to a large extent, owned by the central office. After registration of the login instance and the registration of the payment for that instance, a new object is created for that new UID in the local database, as indicated by a block 410. The flowchart then loops back to the beginning.

Figure 5:
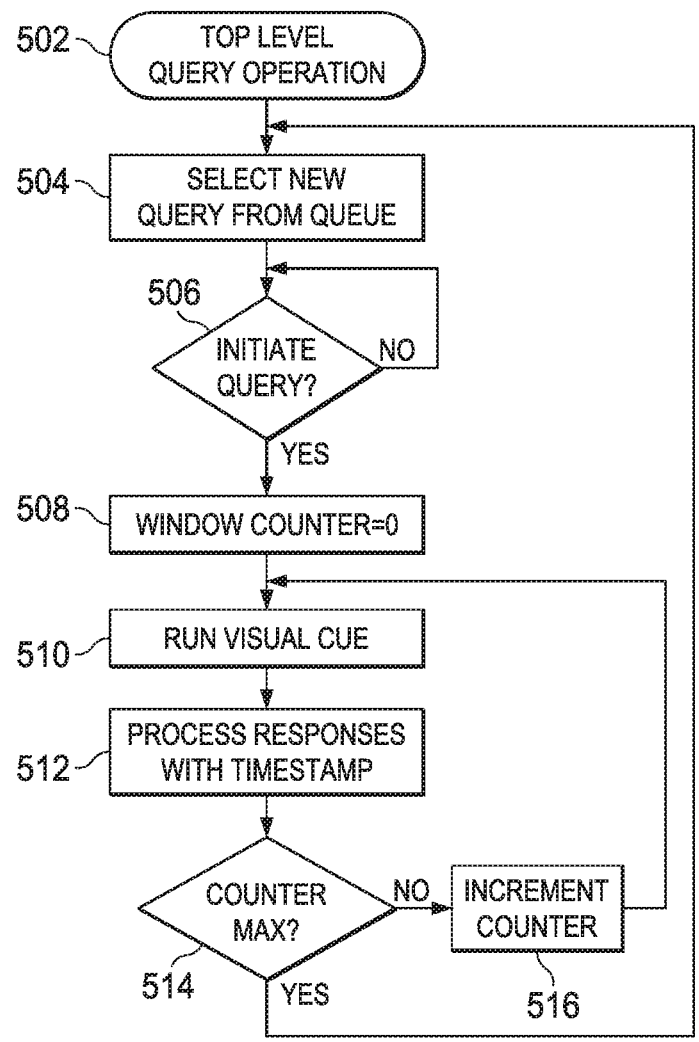
FIG. 5 illustrates a flow chart illustrating the top level query operation.

Referring now to FIG. 5, there is illustrated a flowchart for the top level query operation, which is initiated at a block 502. The program then flows to a block 504 in order to select a new query from the queue of queries. In general, when the system is set up, there will typically be some type of programming control over the information that is presented to the attendees at the event in the venue 102. This will, from overall point of view, allow each query to be independent within the database. However, they will be placed in the queue so that they can be individually selected at particular times and associated with particular advertisements. The program then flows to a block 506 to determine if the query has been initiated, which will occur at a defined time within the overall program schedule. The program then flows to a block 508 in order to set a window counter to a null value. As described hereinabove, each query requires a response to be returned within a defined time window. This actually gives context and meaning to a response. Otherwise, a simple key interface with a defined set of symbols, letters, or numbers would not be possible. In this matter, the letter A can be used multiple times for multiple queries and have a different meaning associated there with any statistical analysis of the overall data structure.

The program then flows to a function block 510 after it has been initiated and sent to a null value to run the visual cue. This way they see some type of advertisement with some type of enticing response required. The program will then flows to a function block 512 in order to process all of the responses received within the window, each of the responses having a timestamp associated therewith such that only responses received with a timestamp within the query window will be logged. The program then flows to a decision block 514 to determine if the counter is a maximum value, i.e., the end of the query time window. If not, the program flows along the "N" path to a block 516 in order to increment the counter and then back to the input of the block 510. This will occur until the counter has reached its maximum value, at which time flowchart will back around to the input of the block 504 to select the next query.

Figure 6A:
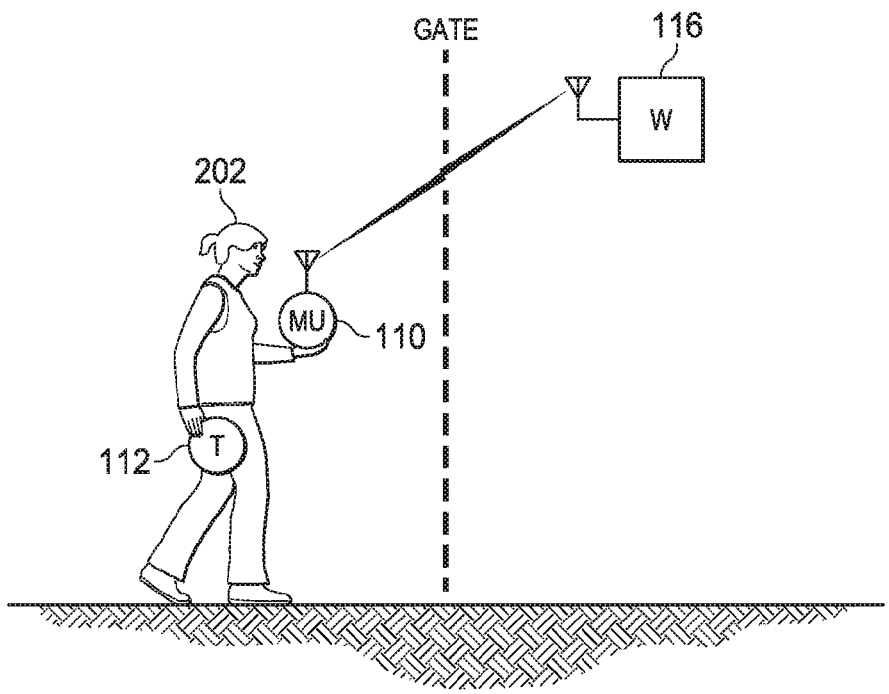
FIGS. 6a-6c illustrate examples of the initial registration when entering the venue.
Figure 6B:
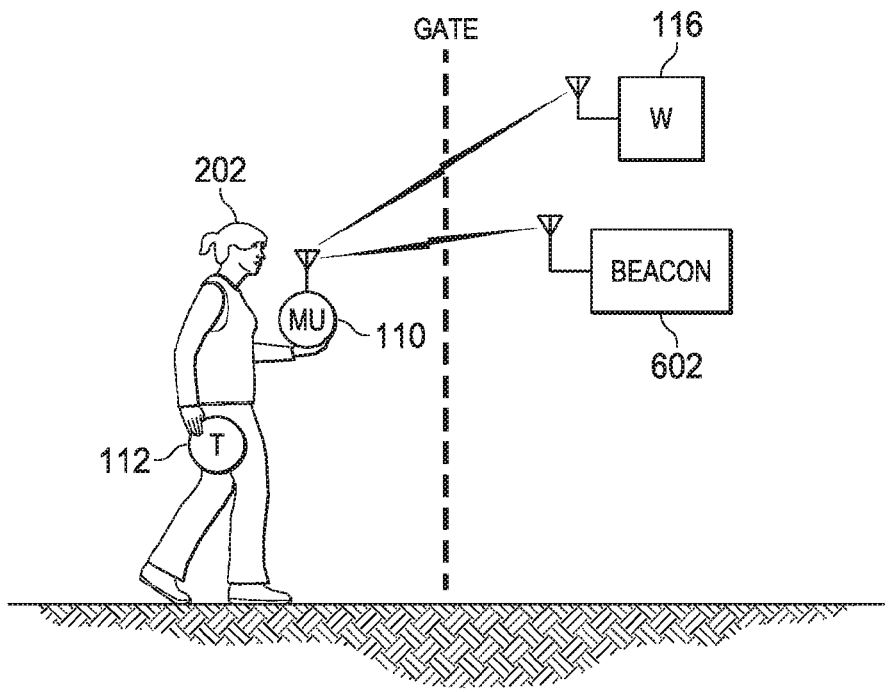
Figure 6C:
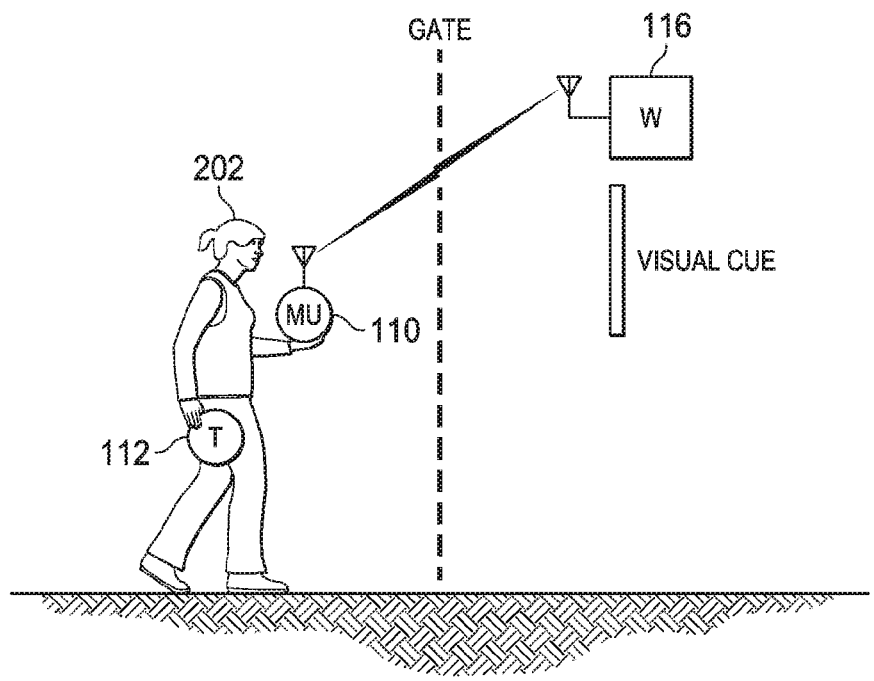

Referring now to FIGS. 6A-6C, there are illustrated three different diagrammatic views of how the presence of an individual 202 is recognized at one of the gates 104 or 106. In the embodiment of FIG. 6A, the individual 202 has the ticket 116 associated therewith, and, upon reaching gate, the individual 202 is prompted by some type of signage or the such to activate their application. Upon activating their application, the individual 202 can be presented with a screen to select a particular response which, when transmitted to the wireless device 116 with the created UID of the MU 110 and information regarding the selected response. As will be described hereinbelow, that is defined as a Response ID (RID). The second embodiment associated with FIG. 6B, the individual 202 is recognized by a beacon 602 which generates a signal that can be scanned by a separate receiver on the MU 110. These typically operate under IEEE 802.15.XX protocol, and they typically have some type of unique ID associated therewith and, in some instances, especially with the beacon, a command structure that allows more than just an ID to be sent. These can be a Bluetooth system or a BLE system or a Zigbee system or other similar systems. The point is that the application running on the MU 110 can recognize this ID and, upon recognizing this ID, can launch the full program and display the screen to the individual 202. The individual 202 then enters the ticket number in the MU 110 then creates the UID and generates a response, i.e., it answers a question which is an initial question, and then transmits this to the wireless device 116 for transmission to the local CO 120 for registration.

In the embodiment of FIG. 6C, there is illustrated an embodiment wherein the individual answers the initial question via some type of visual cue that is presented at the gate. This is a special visual cue that may be permanent. The user must answer this question in order to be registered. The screen of the user may actually display a simple display indicating to the user that they must view this visual cue at the gate and enter it in order to be eligible for a prize. This will prompt the individual 202 to input information from the ticket in additional to answering the response. Again, what is required to register the particular device with the local CO 120 is to generate UID from the ticket and then answer a question and provide one of one or more available responses to that question and forwarded the UID and RID to the local CO 120.

Figure 7:
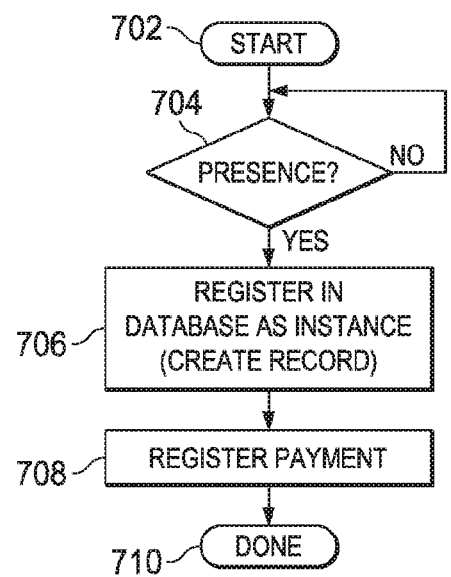
FIG. 7 illustrates a flowchart for the overall registration operation.

Referring now to FIG. 7, there is illustrated a flowchart depicting the overall detection of the presence of an individual at a gate, which is initiated at a block 702 and then proceeds to a decision block 704. This decision block 704 determines if it has detected the presence of a new device entering the venue 102 and, if so, the program proceeds to a function block 706 to register that user in the database as an instance, i.e., it creates a new record for that individual device which, thereafter, when it receives the UID from that device in associated with a response, it can recognize that a particular device has responded. This is important in that, for example, an individual might respond with multiple identical responses to a given query. What is necessary from the messenger's point of view is to know the number of separate devices, i.e., separate UIDs, that responded to a particular query. Thus, every one of the UIDs generating the responses to a particular query with a particular timestamp such that they are associated with that particular query will be logged, such that the messenger can now have a very clear and instant feedback as to the number of individuals actually paying attention to their particular advertisement. For example, if there were 10,000 attendees at an event and 5,000 responded to a particular query, this would indicate to the messenger that their advertisement actually was viewed by 5,000 attendees. Without this system, it is nothing but speculation as to how many of the attendees are actually viewing the advertisement.

The program then proceeds to a function block 708 after registration in the database to basic register a payment, as will be described hereinbelow, to indicate that a new UID has been added to the system. The program then proceeds to the "Done" block 710.

Figure 7A:
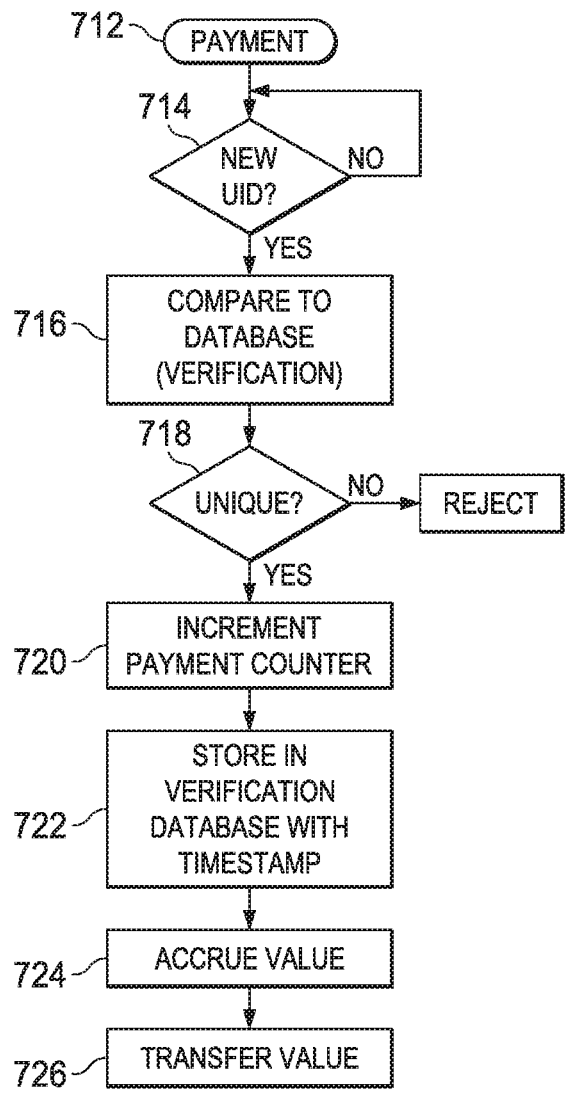
FIG. 7a illustrates a flowchart depicting the payment operation.

Referring now to FIG. 7A, there is illustrated a flowchart depicting the overall revenue model, which is initiated at a block 712 and then proceeds to a block 714 to determine if the new UID has been created. It should be understood that it is possible for an individual 202 to input the wrong seat number and, as such, duplicating another seat number that is already been entered into the system. If the UID is associated only with the seat number, there could be a possibility of a duplicate. If it is a new UID, the program proceeds to a function block 716 to determine if there is a duplicate in the database due to the input of a wrong seat number or such. This is the local database or the verification database. Program then proceeds to a decision block 718 to determine if it is unique and, if not, it rejects and, if so, it proceeds to a function block 720 to increment a payment counter. This payment counter information is stored in the verification database with a timestamp for the particular increment, as indicated by a block 722, and then the program flows to a block 724 in order to accrue the value and into a block 726 in order to transfer value.

Figure 8:
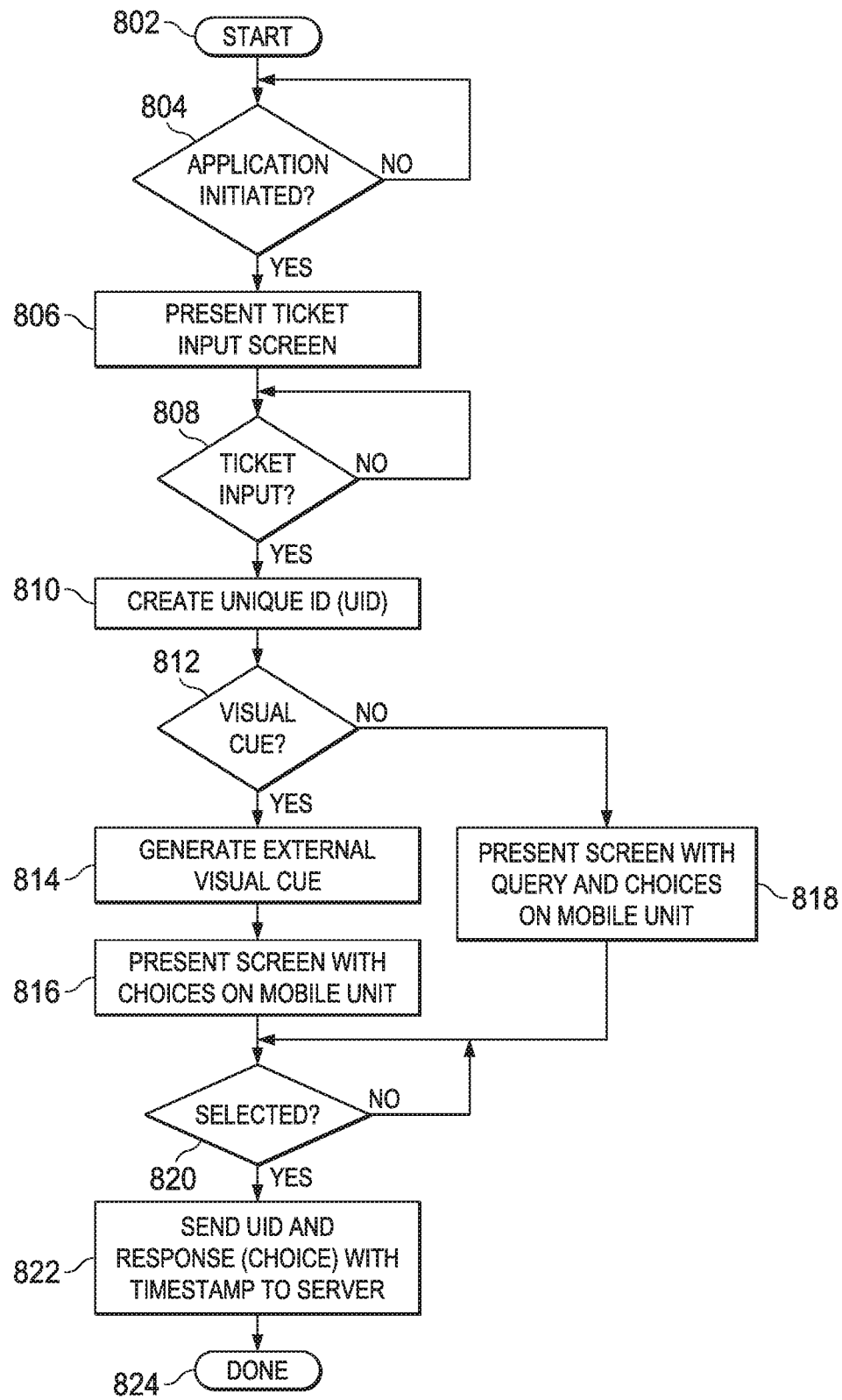
FIG. 8 illustrates a flowchart depicting the overall operation of creating the unique ID.

Referring now to FIG. 8, there is illustrated a flowchart depicting the operation at the MU 110, which is initiated at a block 802 and proceeds to a decision block 804 in order to determine if the application on the MU 110 has been initiated. If so, the program flows to a block 806 to present the ticket input screen to the individual 202. The program then flows to a decision block 808 to determine if the ticket information has been input. As noted hereinabove, that input is basically the section, row, and seat information that is typically on the ticket. However, any information that is unique to the ticket can be provided as input information. One advantage, however, of having the actual "physical" location of an individual is in a situation where in a prize is delivered to that individual as a result of some response. It may be that query is to require the individual to continually "tap" their response key at a rapid rate and for a long duration of time and the individuals that exceed a particular threshold will be awarded, for example, a T-shirt. This can then be delivered to their seat.

After the information on the ticket has been acknowledged as having been input, the program flows to a block 810 in order to create the unique ID (UID) on the device itself. This UID, as described hereinabove, is basically the information regarding the section, row and seek information associated with the ticket, in one example. This is created on the device and stored on the device as a local value. The program then flows to a decision block 812 in order to determine if the next step, the requirement that a response be provided, is to be provided by a visual cue. The visual cue could be a sign at the gate that indicates to the individual that they are to initiate their application on their device and then depress "1" for an indication of the Male gender and, for indication of the Female gender, depress "2" when the display of the potential or available response buttons is displayed to the individual. Of course, the display will only be displayed after the operation is initiated. This is the process that is associated with the "Y" path which flows to a function block 814 to generate external visual cue, either in real time or as a fixed display, and then the program flows to the function block 816 to present the screen or display with the various choices on the user's device. If, alternatively, no visual cue is provided externally, the user is presented on their device with a screen that provides a choice with a query, such as "select your gender" with only two choices provided, "1" for the gender Male and "2" for the gender Female, as indicated by block 818. Once user has selected one of these two, then the application will shift into the full response mode and a full-screen of all available responses will be displayed, as will be described hereinbelow.

The program then proceeds to a decision block 822 to determine if the selection has occurred, and, if so, the program proceeds to a function block 822 in order to send the created UID and that the response code (RID) along with a timestamp to the server and in the program proceeds to Done block 824.

Figure 9:
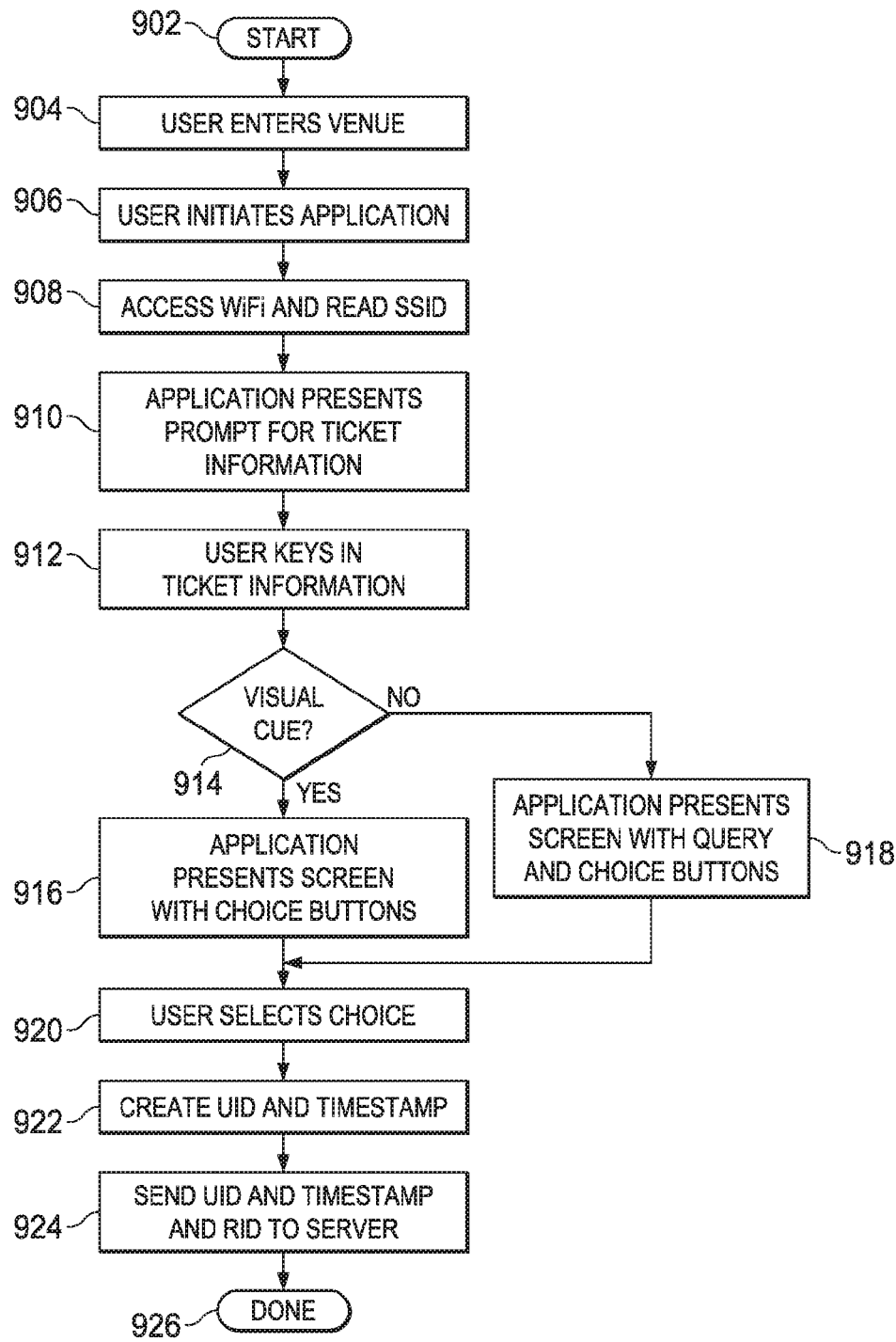
FIG. 9 illustrates a flowchart depicting the operation of creating the unique ID at the user's device.

Referring now to FIG. 9, there is illustrated a flowchart depicting the overall operation of the user entering the venue and the overall operation. The program is initiated at a block 902 and then proceeds to a block 904 wherein the user enters the venue. Once the user enters a venue, the user then initiates the application, as indicated by block 906, which, as described hereinabove, can be initiated by the user, or some external device such as a scanner or gate beacon or the such can be utilized to automatically activate the application upon passing a gate. When the application is initiated, it will access the network and determine the SSID or some similar identification information associated with the network from the network, as indicated by block 908. The application will present to the user a prompt for ticket information, as indicated by block 910. The program then flows to block 912 wherein the user will key in the ticket information. However, alternatively, there could be provided the ability of the user's device to actually scan the ticket with the camera which will allow the camera to extract unique information there from. The unique information could be, in the one disclosed embodiment, the section, row, and seat information associated with the ticket or could be some unique code on the ticket. As long as this information is unique as to all other individuals bearing a ticket, this will facilitate the operation of the overall disclosed embodiments. Once the ticket information has been input, this allows the unique UID to be created with that information. The program then flows to a decision block 914 in order to determine if there is a visual cue. If there is a visual cue, the application will present the user with choice in block 916 providing choice buttons associated with a particular visual cue that are necessary in order to respond to the visual cue. If no visual cue is presented externally, the program will flow to a block 918 to present the user with a screen having both a query and the choice buttons associated there with. Once the choice has been made, as indicated by a block 920, the program flows to a function block to 922 in order to create the UID with a timestamp and then sends the UID and the timestamp in association with the RID to the server, as indicated by block 924. It should be noted that each available choice will have some code associated there with. As will be noted here below, there are a limited number of available choice buttons that will be provided to user. These will typically be limited to 40. Thus, a five-bit code is all that is required in order to support this number of available choices. Thus, the RID will be a code from 1-40 in binary form. This is a relatively small amount of information to be provided in a transmission. The program will flow to a "Done" block 926.

Figure 10A:
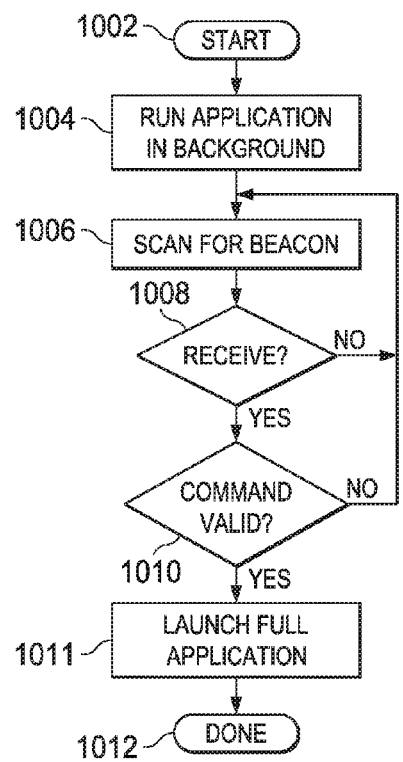
FIGS. 10A and 10B illustrate flowcharts for launching the application based on a presence determination at the gate of the entrance.
Figure 10B:
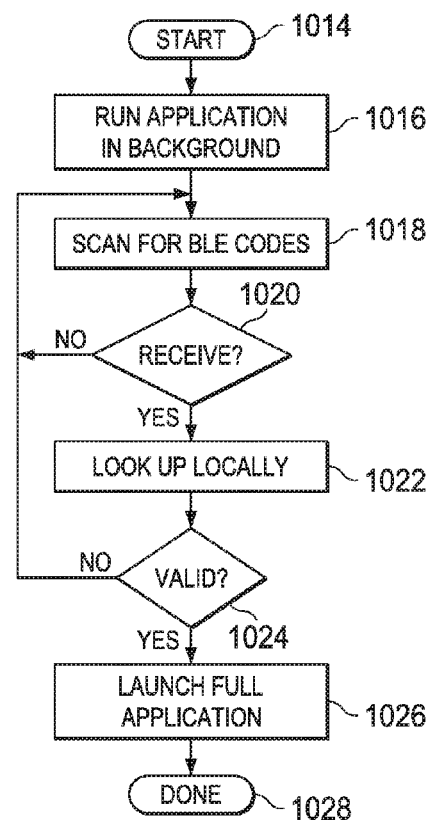

Referring now to FIGS. 10A and 10B, there are illustrated flowcharts depicting the operation of presence recognition operation for determining when a device, and MU 110, is passing through a gate. Referring specifically to FIG. 10A, the program is initiated at a block 1002 and then proceeds to a block 1004 to run the application in the background. In this mode, the full application is not running but, rather, a background application that performs a "sniffing" operation for known signals on one of the multiple radios that may exist within the device. For example, some devices will have a cellular transceiver interfacing with the cell network, and 80.15.4 radio for interfacing with Wi-Fi, a Bluetooth transmitter and maybe a Zigbee transmitter. Additionally, a thread transmitter may also be provided for interfacing with these types of devices. This background application merely looks for the presence of one of these transmitting devices external to the device in order to read its identifying information. This is unique to that device and can be, through a lookup table locally on the device, utilized to take some action such as launching the full application.

The program proceeds to a function block 1006 in order to scan for, in this example, a beacon. A beacon is typically at a transmitting device that not only has a unique ID but also transmits data along with its transmission. This is a one-way transmission and does not require any type of handshake in order to receive the information. Some technologies, such as Bluetooth, do require "hearing" in order to receive information from the transmitting device. The program then proceeds to a decision block 1008 in order to determine if any beacon information has been received. If so, the program flows to a decision block 1010 to determine if any information received from the beacon, such as a command, is a valid command which can be operated on by the background program or application. If not, the program flows back to the input of function block 1006. If the command is valid, the program flows to a function block 1011 in order to launch the full application and then to a "Done" block 1012.

Referring now to FIG. 10B, there is illustrated a flowchart depicting the use of a BLE transmitter. The BLE transmitter is a device that can not only send a unique identifier but also transmit information without requiring "pairing." Program is initiated at a block 1014 and then proceeds to a block 1016 in order to run a background application for the sniffing operation. The program then flows to a function block 1018 in order to scan for BLE codes, i.e., the unique identifier. The program flows to a decision block 1020 to determine if such has been received and, if not, back to the input of function block 1018. Once received, the program flows to a function block 1022 in order to lookup the code locally. If the code, stored in a local database, is valid, this indicates, via a decision block 1024, that the code is a recognizable code, i.e., one that is associated with the overall operation of the system. If so, the program flows to a function block 1026 in order to launch the full application and then to a "Done" block 1028.

With the automatic recognition of an external transmitter with a small local transmission range disposed at an entrance gate, all that is required for an application to be launched is just a recognition of the presence of a particular device within the transmission range of a beacon or similar type transmitting device. This, of course, only initiates the application. There is still a requirement that the individual viewing the screen, which is typically achieved by some type of audible tone or prompt, is to provide some type of response. As noted hereinabove, that response may be a response to a query actually output by the device, which indicates that at least the individual is looking at their phone and interfacing with the application. It could be that the response is in response to viewing some type of visual cue local to the gate. This visual cue could be a "fixed" visual cue or it could be a time varying visual cue. With a time varying visual cue, the timescale that is provided on the response that is sent can be utilized to verify that this response was activated at the gate as opposed to somewhere else. Of course, that necessitates that, not only does the unique ID have a timestamp associated with it at the time it was created, but also that the response to the visual cue be timestamped.

Figure 11:
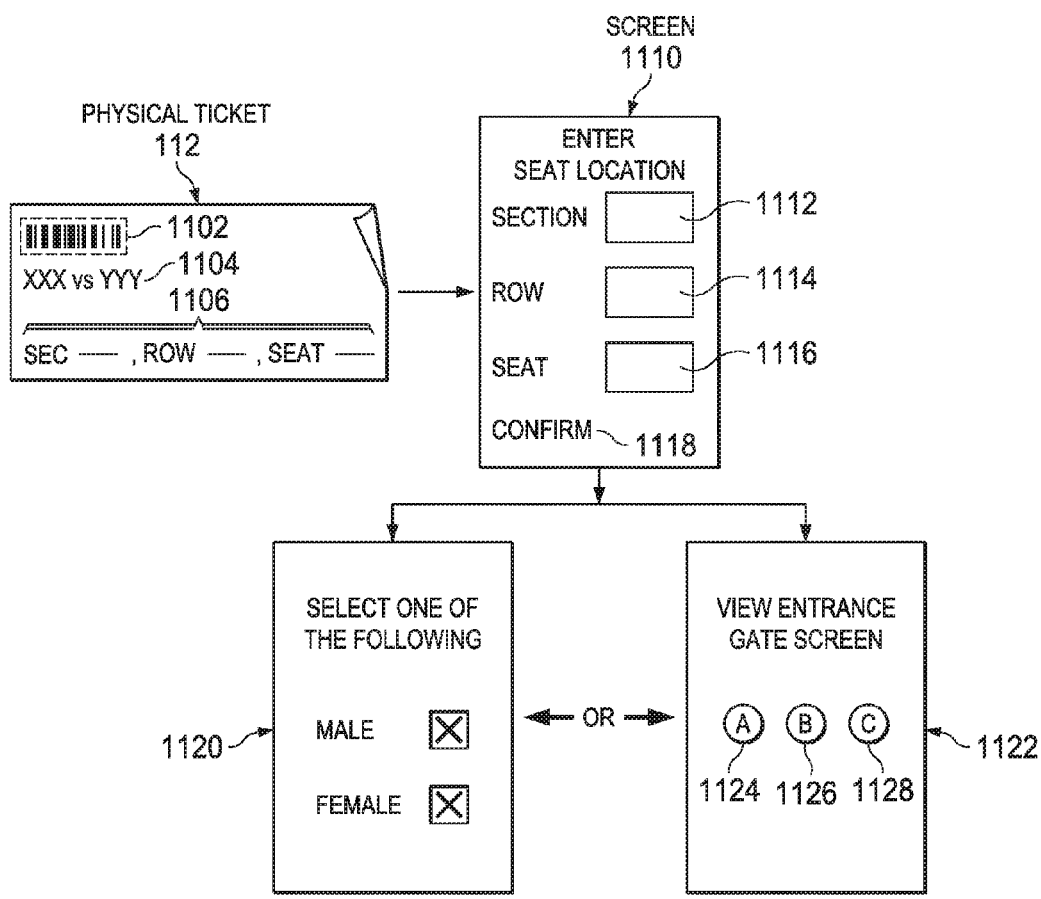
FIG. 11 illustrates a diagrammatic view of the screen interface with the user for entering the ticket information and creating the unique ID.

Referring now to FIG. 11, there is illustrated a diagrammatic view of the initial screen display to the user of the MU 110. As described above, there is provided a ticket 112 that has associated therewith multiple fields. There is provided with some type of unique barcode 1102, information about the event 1104 and also the seat and row information in a field of 1106. In the disclosed embodiment, the section, row and seat information is what is input. The screen provided is represented by a reference numeral 1110 and displays a text prompt to the user to enter the information regarding the section, the row and the seat in fields 1112, 1114 and 1116, respectively.

Once the user enters this and selects a "Confirm" field 1118, then this information is utilized to create the unique ID as described hereinabove. Then one of two events will happen. The first is that a screen 1120 will be displayed that basically provides a query requesting the selection of one of two choices, in this example, either a Male or a Female gender. By selecting one of these two, a response can be generated that actually provides information to the database as to the gender of the individual. Interestingly enough, as will be described hereinbelow, this provides to the messengers information regarding the gender of each unique ID (UID) that is in the system. However, studies suggest that a certain percentage of the individuals will make a mistake on their entry for whatever reason in a certain number of individuals will actually put the wrong answer in. Thus, what will be indicated to the messengers is that statistically this person is one gender or the other, but this is not a 100% indication.

The other aspect of it will be the presentation of a screen 1122 which prompts the user to view some type of screen that is proximate to the entrance gate. The screen is utilized for the purpose of providing the first query which is required in order to actually create the entry into the database of the UID for that particular device. There is presented in this screen 1122 various response fields, in this example, 3 response fields, 1124, 1126 and 1128. In this example, there would be provided a viewable screen that provides some type of query requiring the selection of one of three selections as the response. These responses, in addition to allowing registration of the UID in the database, also provide some statistical information about a person associated with that UID.

Figure 11B:
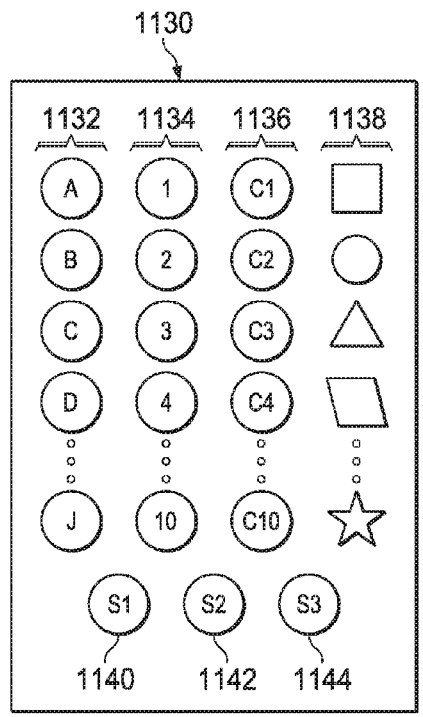
FIG. 11B illustrates a screen view illustrating the fixed selection of possible response buttons provided to a user.

Referring now to FIG. 11B, there is illustrated a depiction of an actual screen that is provided after registration of the UID for providing responses to various queries. This screen is represented by reference numeral 1130. This screen 1130 provides a fixed number of displayed response codes. There are provided a first column 1132 of output alphabetical characters, the first 10 characters of the alphabet from A through J. There is provided a second column 1134 for the first ten numerical characters from 1 through 10. There is provided in a third column 1136 the first 10 the primary colors, each color represented in a circular button. There are provided in a fourth column 1138 ten basic shapes such as a square, a circle, a triangle, etc. Thus, there are provided 40 fixed characters that will always be provided on the screen. None of these characters is dedicated to any particular response to any particular character. When building a query, designer of that query actually maps a particular response key to the database and the definition of a desired response, as will be described hereinbelow. All that is necessary is to provide a simple code for each one of these buttons. Thus, only a five-bit code is required to provide the code for each of the buttons. For example, it may be that the first query has two responses that are presented, "A" and "B." In the database, it may be that this particular query determines that the people answering the query with a "A" response have a likelihood of being 60% Male and the people answering the query with a "B" response have a likelihood of being 60% Female. First, the fact that they answered with either response indicates that there looking at the screen and this is important information to have. A further refinement of the response can be provided by mapping a particular response to certain statistical records. This will be described in more detail herein below.

There are also provided three response buttons 1140, 1142 and 1144, respectively, that are not responses that can be mapped into the database outside of the MU 110. These buttons 1140-1144 are provided for another function, and the function is to allow interface with the internal application in response to a visual cue, which will be described hereinbelow.

Figure 12:
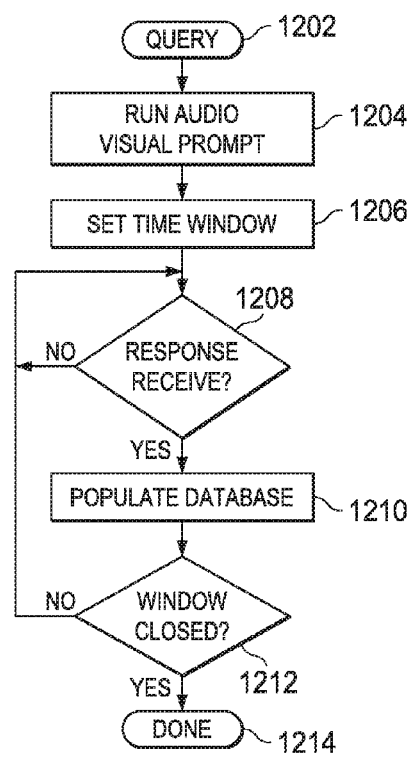
FIG. 12 illustrates a flowchart depicting the query operation for generating a query for viewing by the user.

Referring now to FIG. 12, there is illustrated a flowchart depicting the operation of running a query at a top level. This program is initiated at a block 1202 and proceeds to a block 1204 in order to run the audio or visual prompt. The program flows to a function block 1206 in order to set the time window within which a response is to be received for that particular query. The program then flows to a decision block 1208 to determine if any responses have been received and, if so, then to a function block 1210 in order to populate the database with a response, which just indicates that this particular MU 110 via its UID is actually associated with a person looking at the prompt. The program then flows to a decision block 1212 to determine if the time window has closed for receiving responses. If not, the program will continue to loop back to the input of the decision block 1208 until the time window is closed for that particular query, at which time the operation is terminated at a "Done" block 1214.

Figure 13:
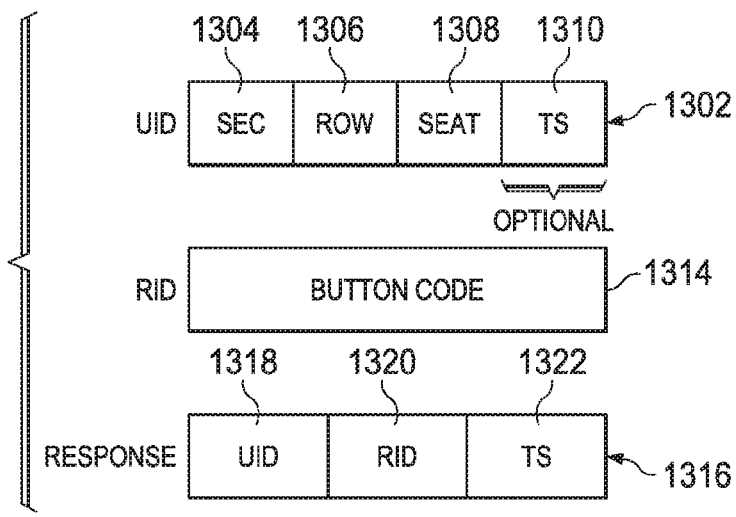
FIG. 13 illustrates the data structure of information assembled at and transmitted by the Mobile Unit.

Referring now to FIG. 13, there is illustrated a diagrammatic view of the various data structures generated by the MU 110 during registration and operation. In a first data structure 1302, there is illustrated the various data fields for the UID. They are defined as a first field 1304 associated with the row, a second field 1306 associated with the row and a third field 1308 associated with the seat. A fourth section 1310, an optional section, is associated with a timestamp that can be utilized at the time of the creation of the UID to uniquely define it in the event that somebody else actually this enters their seat number, for example. This is not a timestamp that is used for identification of the time at which the UID is transmitted but, rather, just additional information to make the UID more unique. Of course, it could also be utilized for the purpose of determining the time in which the UID was created. This particular data structure requires very little data bandwidth to transmit such, as the information contained in there is minimal.

For the second data structure, a data structure 1314 is provided for the button code for the response, which, as noted above, is the response ID (RID). This is a five bit code. The actual response that is sent is illustrated by a data structure 1316, which is comprised of a first data field 1318 having associated therewith the UID, a second data field 1320 associated with the RID, a third data field 1322 associated with a timestamp, TS. This field 1322 is actually the timestamp that is generated when the response is actually created as compared to the timestamp infield 1310 that further defines the UID as unique. Overall, this response data structure 1316 is all that is required to be transmitted in response to seeing a visual cue. There is no two-way communication that is required between the server and the MU 110, thus reducing the overhead load on the network traffic. Thus, for example, if the response data structure 1316 required three bytes of data, 10,000 participants viewing a visual cue and responding thereto would only transmit 30 Kbytes data within the window. If that window defined by the query was open for just one second, there would be required a minimum bandwidth of 30 Kbytes/sec, which is well below the lowest bandwidth Wi-Fi connection to any network. Thus, if one of the responses was to see how many times any individual associated with a UID could "tap" a particular response button, it would still be difficult, with the human response time, to exceed any practical bandwidth limit in a network. It is a minimization of overhead and the production of the actual data that is required to provide information to an messenger. Again, what is provided by the response button is both an indication of "eyes on the screen" and also some back end statistical data.

Figure 14:
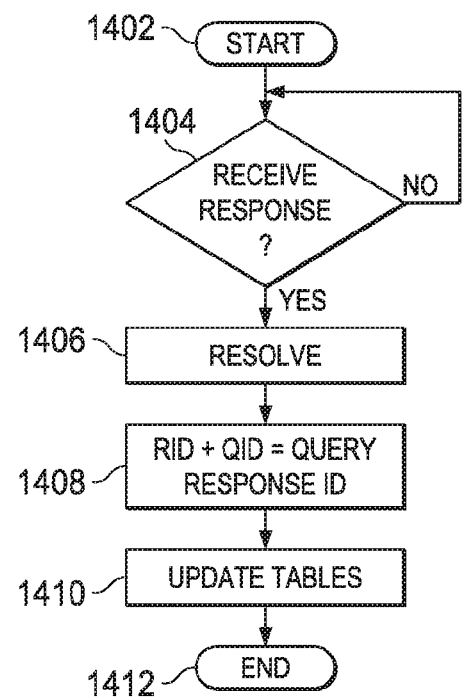
FIG. 14 illustrates a flowchart for a server receiving a response.

Referring now to FIG. 14, there is illustrated a flowchart for the server receiving the response, which is initiated at a block 1402 and proceeds to decision block 1404 in order to determine if a response has been received. When received, the program flows to a function block 1406 in order to resolve the particular response. What has been received at this point is a response having a UID, and an RID and a timestamp. What is resolved is, knowing the time window, the presence of a unique code which is a combination of the RID and QID (query ID), is indicated by function block 1408. This combination, as will be described hereinbelow, is a unique ID that can be utilized for back end statistical analysis. The UID is also resolve and is utilized to indicate that a particular UID has responded (noting that any time that response is referred to as being responded by UID, this also means that it is being responded by MU 110). If the query, for example, just wanted to know how many individuals are looking at the screen in response to a particular query, any response received, whether it be multiple responses or a single response, during the time window associated with the query will provide an indication, for for all received UIDs, of the number of individuals that paid attention to the query, and all that is required to resolve this particular query into any useful information is the UID. By looking at the combination of the unique RID plus QID, further information can be determined to resolution associated with other tables mapped to this particular query and response. The program will then flow to a function block 1410 in order to update various tables and into and "End" block 1412.

Figure 15:
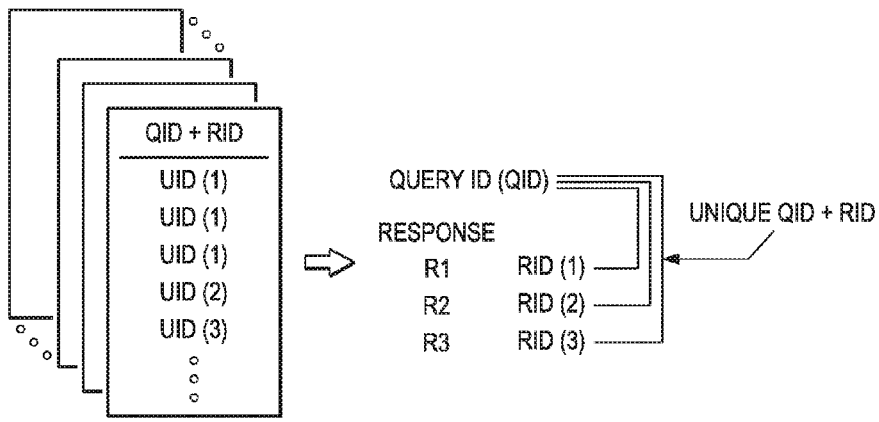
FIGS. 15-18 illustrate diagrammatic views of the various records that are generated and populated in the local database.

Referring now to FIGS. 15-18, there are illustrated diagrammatic views of how the tables are generated for various combinations of RIDs for a particular query ID (QID). For example, for a given query, there may be three responses provided, R(1), R(2) and R(3). It may be that the query presented to the individual is the choice of responses "A," "B," and "C." These particular response codes will be mapped to some type of information associated with that response. For that response, i.e., for the first response in association with a particular QID, QID+R (1), this combination being a unique ID that defines a unique object or table within the database for this combination. Thus, within this particular table associated with that unique ID, the particular UIDs that responded as such can be contained therein and each of these UIDs will provide pointer back to the actual UID record associated with that UID. FIG. 15 illustrates these particular tables.

Figure 16:
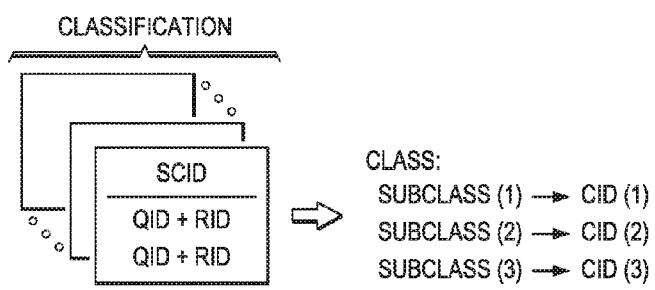

In FIG. 16, there is illustrated a further refinement of the information. As will be described hereinbelow, queries can be provided with information associated with classifications. For example, there may be a classification of "gender." This would have the sub classification, at its highest level, of male or female. Classification would have a classification ID of CID and the sub classification would have a unique ID of SCID. For example, take the example of gender. This can be so classified into possibly ten different analytical "bins." The system could be designed such that a prior knowledge of a particular generated query could be resolved into ten different percentage classifications, one wherein the gender is classified as follows:

10% F/90% M
20% F/80% M
30% F/70% M
40% F/60% M
50% F/50% M
60% F/40% M
70% F/30% M
80% F/20% M
90% F/10% M

Figure 17:
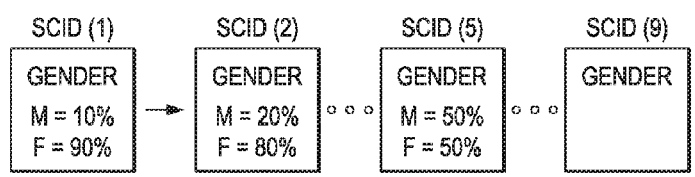
Figure 18:
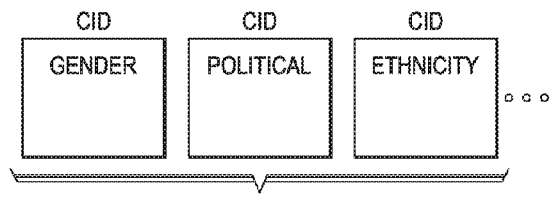

Thus, a particular response can actually be mapped to one of these statistical bins. This would thus require that the designer of the query understand that when a particular individual responds with the particular response, this will indicate to the database that, for example, 80% of the respondents are female. Each of these particular sub classifications can be mapped all the way back to the UID and the QID+RID unique code. This is illustrated in FIG. 17. The actual CID is illustrated in FIG. 18, indicating that there can be one CID for gender, one for political affiliations, one for ethnicity, etc. By utilizing prior information known to the designer of the query, each response can be mapped to multiple different classifications and sub classifications, such that just the response provided by any MU 110 can be resolved into information regarding the particular individual that responded to such. Certain information can be determined as to their gender, as to the political affiliation or as to their ethnicity and other such information.

Figure 19:
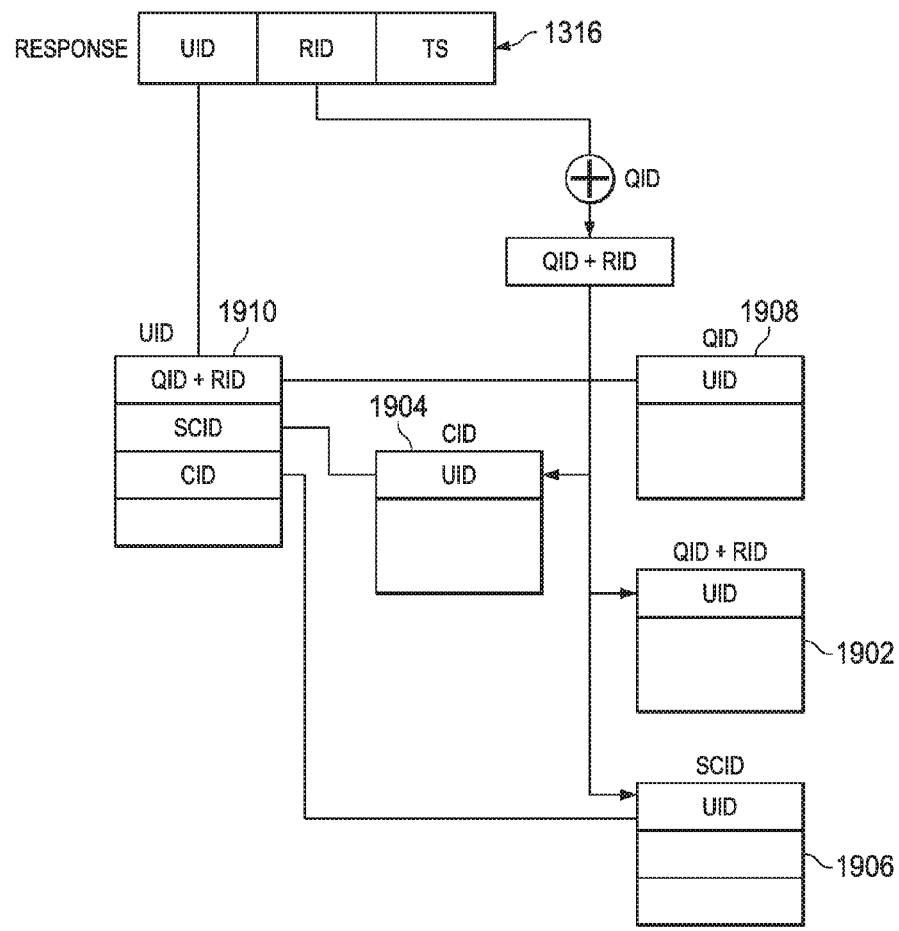
FIG. 19 illustrates a diagrammatic view of the overall relationship between multiple records and unique IDs in the system.

Referring now to FIG. 19, there is illustrated an additional diagrammatic view of how the mapping occurs. The additional response data structure 1316 is resolved such that the UID will define a UID data record or object that is to be updated with the various information provided by the analysis and the mapping of the responses. The resolving technique defines, with the response and the query in which the response was received, the unique ID for the QID+RID denoted in a table or object associated therewith. This is a table 1902, which is updated with the particular UID that responded with that particular response code. This QID+RID unique code is mapped to a CID table 1904 to place a pointer to the UID therein. This also points to an SCID table 1906 such that the UID can be placed therein. There's additionally a QID table 1908 that has the particular UID associated with this response placed therein. Thus, by looking at any one of the tables associated with the UID table, all of the UIDs that were associated with a particular response for the QID will have a reflection of the number of UIDs that responded as such. If, for example, one wanted to know how many UIDs responded to just the gender question where either response indicates some information about gender, one need only look at the CID table 1904 associated with that particular response, i.e., the one to which the QID+RID unique code was mapped to. If one wanted to look at how many respondents replied to the particular query, all that is required is to look at the QID table 1908 and this will give a total of all of the UIDs that responded to the query. There is knowledge, of course, as to how many total UIDs are in the system or are present at the event. If, for example, at halftime of a basketball game, any query was presented to the attendees and a response resulted in a 40% response, this would indicate to the messengers that 40% of the attendees were viewing the screen. Some information can be gleaned from this information. However, this provides an actual real time indication to the messengers of the fact that they were able to have 40% of the attendees with "eyes on the screen."

Figure 20:
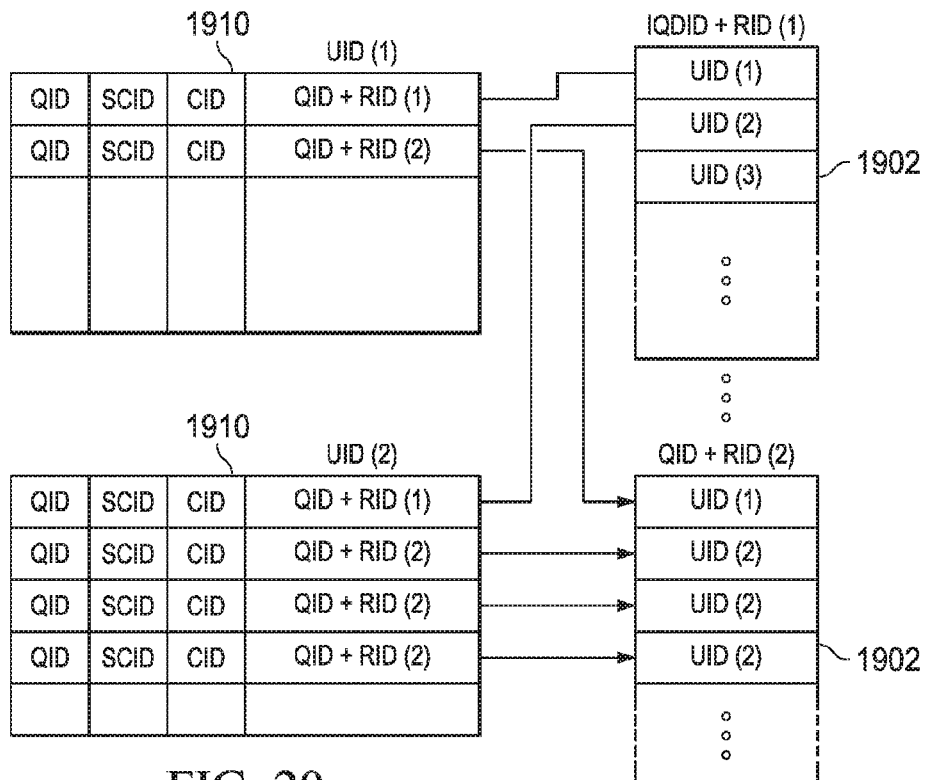
FIG. 20 illustrates a detail of the records illustrated in FIG. 19.

Partly referring now to FIG. 20, there is illustrated a more detailed diagrammatic view of the mapping operation. It can be seen that, for each UID in table 1910 that each UID has associated therewith a QID, an SCID, a CID and a QID+RID. There is shown the mapping to the table 1902 which shows multiple UIDs mapped thereto. There are illustrated two UID tables flanking 1910 Thereto. These tables also mapped to a second QID+RID table 1902.

Figure 21:
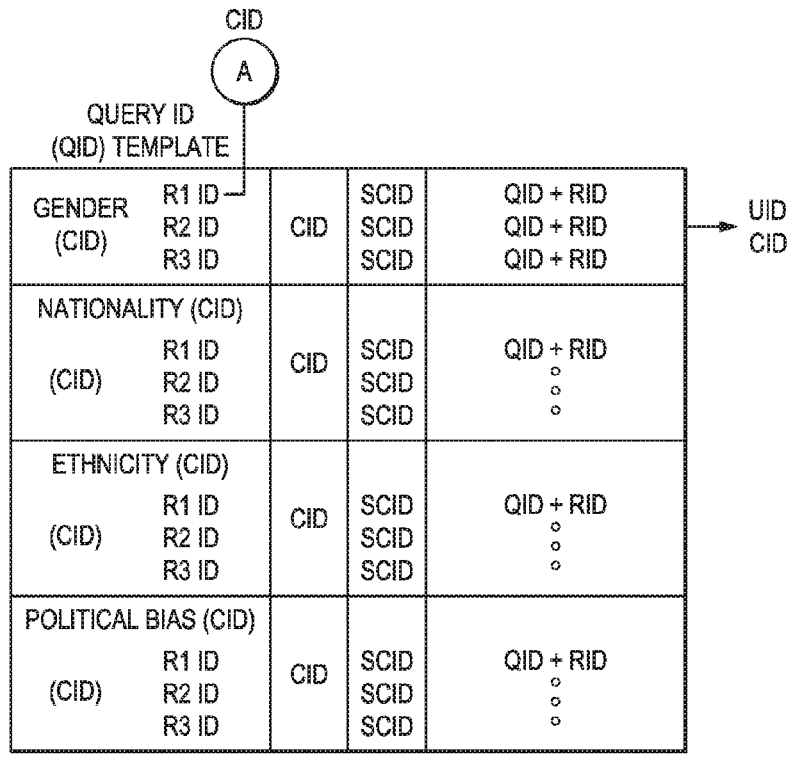
FIG. 21 illustrates a diagrammatic view of the template utilized for creating a query.

Referring now to FIG. 21, there is illustrated a diagrammatic view of an overall template for creating a query. This template provides the ability to map any particular classification and sub classification with any response. For example, illustrated in the template are four classifications, gender, nationality, ethnicity and political bias. Each of these may be selected as somehow associated with a particular query. The designer of the query will then be provided with the ability of providing any number of response buttons in their queries. Each of these response buttons just needs to be mapped to a particular sub classification ID, SCID, in order to give it meaning. Thus, the gender has a CID, to which the particular query is mapped for a particular query. This will be CID gender ID. There may be, as noted hereinabove, nine sub classifications. Each of the response buttons can be mapped to one of the sub classifications. It is illustrated that the response R1 ID is associated with the RID to the particular map button, for example, the "A" button. This will be mapped to the particular unique QID+RID code for that combination of the particular QID for the query being designed and the RID associated with the "A" button. This will be generated as a particular object in the system or record for that unique ID. This would be mapped to a particular SCID. It is asserted to keep in mind that this particular SCID is a predefined SCID, such that it can be utilized to collect data from multiple queries. It is not associated with just this particular query only but the particular QID is associated with query and the particular mapping of the RID to a particular button for that query in the form of the unique ID, QID+RID. It is noted that the first RID, that associated with the R1 ID associated with the "A" button will exist for each of the particular classifications, i.e., for the nationality CID, the ethnicity CID and the political bias CID. Thus, what will happen is that, upon providing a response via the "A" button for that particular query, this particular UID will be mapped into each of the SCIDs to which that response button is mapped. By looking at the QID table, the total number of UIDs responding thereto will be known. By looking at an SCID table, all of the responses over all queries will be known. With respect to gender, for example, if there were nine different bins associated with nine different SCIDs, a bell curve could be generated from all of the data that is received for the multiple queries indicating the general gender makeup of the crowd. This is all derived from just simple responses received from multiple MUs 110 transmitting a minimal amount of data responses for a query to a server.

Figure 22:
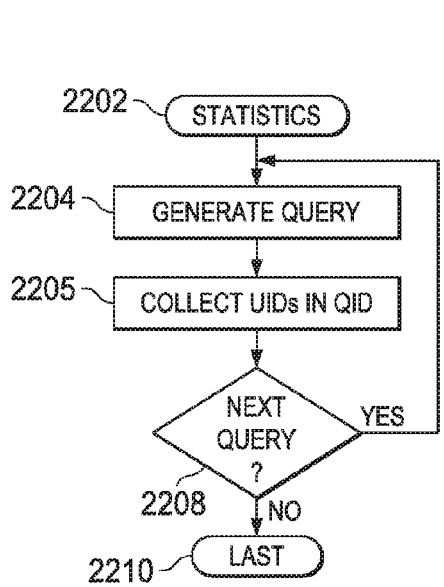
FIG. 22 illustrates a flowchart of analyzing and collecting statistics via the crowd-based response input.

FIG. 22 illustrates a flowchart depicting the overall operation of collecting statistics via all of the responses received in the crowd-based response system, which is initiated at a block 2202. The program then flows to a function block 2204 in order to generate the query. As noted hereinabove, the query is actually designed such that it has embedded therein statistical information that can be derived from a particular response. For example, press "1" for female and "2" for male. This particular key, i.e., that for the "1," is for that query during that time and is statistically related to the gender female. Of course, studies of individuals responding to that question may indicate that the 80% will actually be female. Thus, a statistical certainty of 80% can be associated with that particular "1" button for that particular query during that particular time window. That will accordingly be mapped to an SCID for that particular statistical certainty of female. It may be at another query was designed such that the button "C" was mapped to that SCID and, for that query in that time window, the button "C" is associated with the statistical certainty of 80% female. After generation of the query, the various UIDs responding thereto, as indicated by a block 2205, will be collected and the various data records updated. As noted hereinabove, a particular response can be associated with multiple SCIDs for a given button.

After all of the UIDs are collected and mapped to QIDs, CIDs, and SCIDs, the program flows to a decision block 2208 in order to determine if another query is in the queue. If so, the program backs around to the input of the block 2208, and, if not, the program flows to a block 2210 indicating that this is a last query.

Figure 23:
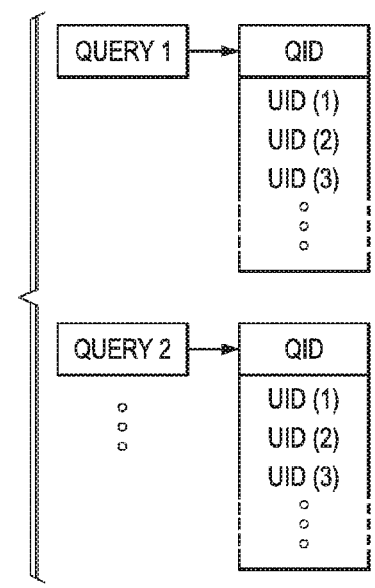
FIG. 23 illustrates a diagrammatic view of the relationship between the query and the UID.

Referring now to FIG. 23, there is illustrated a diagrammatic view of how a query is mapped to a QID, for example. When the query is output, as noted hereinabove, a time window is defined which is uniquely associated with that query. The response is resolved down to the UID, the timestamp and the RID. In the QID, all of the UIDs responding will be collected. Thus, all that is necessary is to look at the QID, which is unique as to a time window. For example, if there were two queries that were basically identical, and they were generated at different times, they would actually have a different QID, as each is unique with respect to its time window. It may be that a particular individual associated with an MU 110 presses the button more than once. This would provide the same UID in the particular QID record more than once. During the analysis, this can be discriminated. If it was desirable to see how many unique UIDs responded to a particular query to see how many people's "eyes on the screen" there were, then all that would be necessary was to determine the number of unique UIDs that responded. If, on the other hand, it was desirable to see how many times a response was provided to a particular query, the QID for that query be analyzed for the total responses including multiple responses from associated UID. This is illustrated in FIG. 23 in the form of two different queries associated with two different QIDs.

Figure 24:
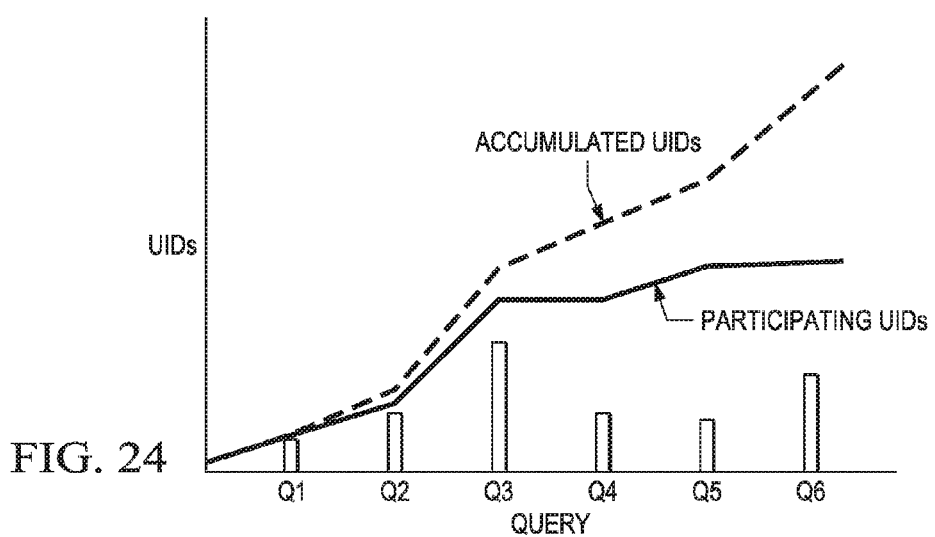
FIG. 24 illustrates the overall response that can be collected from that particular query.

Referring now to FIG. 24, there is illustrated a diagrammatic view of an example of an analysis with respect to these queries that are presented in each query. They can be seen from this graph that initially, the first query had a low number of responses and, as the event wore on, certain queries have higher level of responses as opposed to other queries. These are total responses to a particular given query. The first bar chart illustrates the total number of responses for a given query. An additional analysis can accumulate the total number of responses by accumulating UIDs over the time of the event. Additionally, an analysis can be performed to determine the actual participating UIDs. It may be that certain MUs 110 participate in the response-based operation more than others. There could be, for example, 30,000 attendees, of which 10,000 are registered with an associated UID. By knowing the number of total registered MUs 110, a determination can be made as to what percentage at any given time is actually participating, and also an analysis can be made as to the distribution of participation by the registered users. There may be a certain portion that responds to every query, a certain portion that only responds to 50% of queries, a certain portion that responds only 25%, and a portion that never responds. This can be important information for an advertiser/promoter. Additionally, since the seat number is known from the UID itself, as this is embedded information therein, it is possible for the system to actually map responses to certain areas of the live event. For example, suppose that the event were a baseball game. It is well-known that seats behind home plate are the most expensive seats, and the bleachers are the least expensive seats. It may be that certain queries are responded to more heavily by attendees in the bleacher seats as opposed to those in the behind home plate seats. A statistical certainty may actually be placed upon a particular seat with respect to income, for example. Thus, if it is determined that at certain times during the event that more responses are being received from UIDs associated with behind home plate seats, it is possible to actually tailor the queries during those times for those particular attendees. The analysis can be performed real-time to actually change the subject matter of the queries that are presented.

Referring now to FIG. 25, there is illustrated a simplified diagram of the mapping of a query to an SCID. Each query, the QID and the CID, can be mapped to a particular SCID. This is defined in the design of the particular query. The SCID is associated with a statistical certainty such that any choice can be associated with any SCID. As noted hereinabove, a query is defined with anywhere from one to multiple choices, each choice associated with a particular button. That button will be associated with one or more SCIDs. These, again, are predetermined statistical certainties that are defined in the context of the particular query. Illustrated are multiple queries. The first query, query 1, has two choices, a choice 2502 and a choice 2503, meaning that there are two buttons associated with that query to allow the user to make two choices. It is noted that a choice may also require the pressing of multiple buttons and not just a single button. Thus, the combination of buttons would constitute a choice. The first choice 2502 is associated with an SCID 2506, an SCID 2508 and an SCID 2510. Each of these SIDs 2506-2510 have a different statistical certainty associated with a different classification or CID, such as gender, political affiliation, ethnicity, etc. The second choice 2503 is associated with an SID 2512, this being a different statistical certainty for a different classification. There is provided a second query, query 2, that is illustrated as having a choice, a single choice, that will be associated with the SCID 2506, the SCID 2510 and the SCID 2512. A last query, query (m), has three separate choices, one associated with SCID 2506, one associated with SCID 2508, and one associated with SCID 2512. This association is, again, defined in the design and the generation of the query. By having some knowledge of the particular query in the context thereof, a designer of the query can determine statistical relationships between that question, the response elicited and the statistical certainty from that response. Again, the example of just selecting one of two choices, one for female and one for male, will be easy to design, as it will be provided an SCID for male and an SCID for female. If there were a query asking if you are an out-of-town visitor, that would be a statistical certainty for a nonresident. A query for information regarding "your country of origin" could provide five responses via five separate choice buttons for Europe, Asia, South America or Canada, and these four choices would provide a statistical certainty for four different SCIDs, each associated with one of those choices. In this query, for example, each button that is provided at that time for that query has a defined statistical relationship as a result of being associated with a particular SCID, that statistical relationship defined by the properties of that associated SCID.

Figure 26:
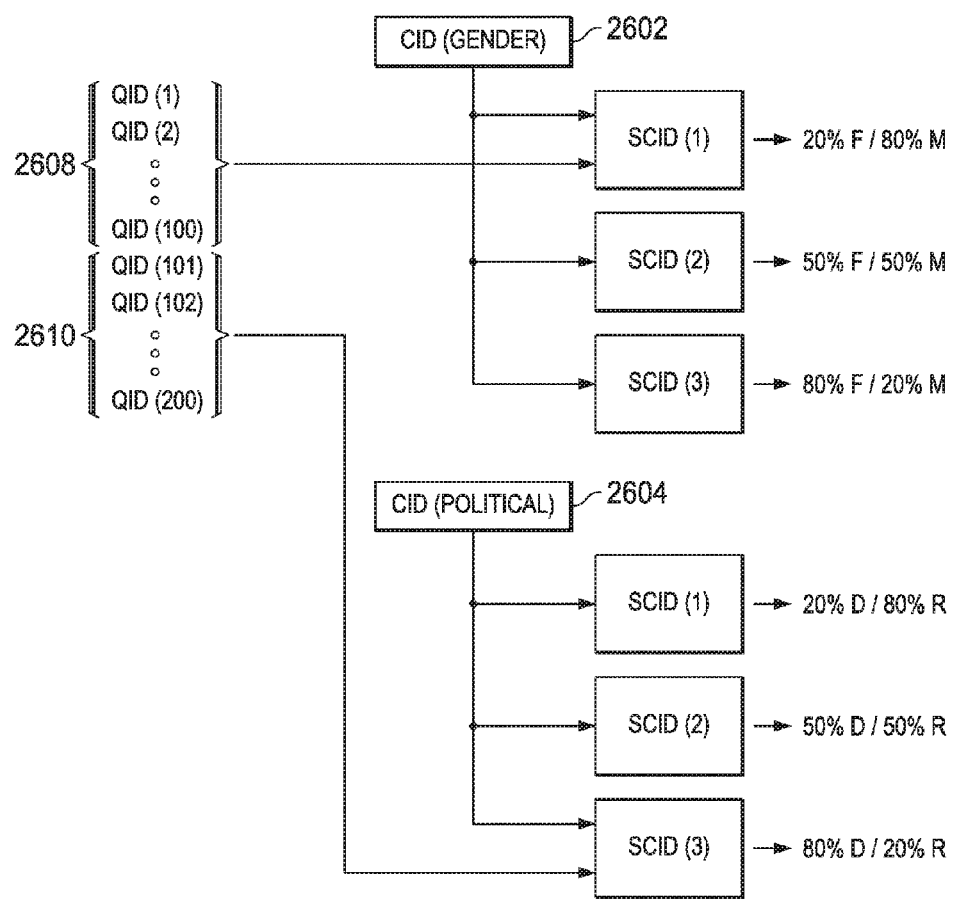
FIG. 26 illustrates a detailed example of a mapping of various QIDs to SCIDs.

Referring now to FIG. 26, there is illustrated a diagrammatic view of one example of the design of a collection of statistical data. In this example, there are provided two CIDs 2602 and 2604, the CID 2602 associated with gender, and the CID 2604 associated with political affiliation. There are associated with the CID 2602 three different SCIDs, one for a ratio of 20% female/80% male, one for 50% female/50% male, and one for a ratio 80% female and 20% female. The CID 2604 is associated with three SCIDs, one for 20% Democrat/80% Republican, 50% Democrat/50% Republican, and 80% Democrat/20% Republican. The designer can define for a particular query which statistical relationship is applicable and select the closest SCID that has embedded therein the statistical certainty. Thereafter, for any given query, each query or number of queries can be associated with that particular SCID. For example, there is a group 2608 of QIDs that are associated with the SCID having a ratio of 20% female/80% male. There is another group of QIDs 2610 having in Association with the SCID for 80% Democrat and 20% Republican. It may be that certain QID in group 2608 are also QID in group 2610. Just the mere response to the QID and, of course, the particular response button associated therewith, it being noted that there may only be a single response, will result in UID making that response being populated into the record for a particular SCID. When analyzing a particular SCID over multiple queries, a determination can be made as to how many unique UIDs responded thereto or the total number of responses. This of course must account for multiple taps and the such. This can be handled in the software response for any query such that not all responses from a single MU 110 are recorded-only a single recording of a response during a given time window will be recorded.

Referring now to FIG. 27, there is illustrated a diagrammatic view of the analysis of one group of SCID associated with the gender CID 2602. There are provided eight SCIDs associated with the gender CID 2602, ranging from 0.1/0.9 through 0.9/0.1 as a ratio of female/male. This is a binning process wherein UIDs responding thereto will be binned therein for all queries. Of course, each SCID is mapped to a particular QID such that any QID can be analyzed for the particular SCIDs that are associated therewith. In the chart, it is illustrated that a distribution of binned UIDs are illustrated, it being noted that there are more females than males in the overall responders. This graph does not show or illustrate the number of queries that were responded to; rather, it illustrates the binning operation of the actual responses that, through the design of the queries.

Although the preferred embodiment has been described in detail, it should be understood that various changes, substitutions and alterations can be made therein without departing from the spirit and scope of the invention as defined by the appended claims.

What is claimed is:

1. A method for interacting with audience members in an event, which event is defined as being at a physical venue location and occurring at a particular predetermined time, wherein the event has a finite number of potential attendees and an associated finite number of unique potential attendee identifiers (UPAIs) allocated to any particular event, which UPAIs can be replicated for other events at other times in the same physical venue location or at events in other venue locations, each of the potential attendees having available thereto one of the unique potential attendee identifiers for the associated event, comprising the steps of:

creating, for a given attendee, when the attendee is in physical proximity to the venue location associated with the event and proximate in time to the occurrence of the particular predetermined time of the event and is prompted to enter a unique potential attendee identifier into a mobile wireless device (MWD), a unique ID (UID) on the MWD by the steps of:
  inputting to the MWD one of the unique potential attendee identifiers; and
  combining the obtained unique potential attendee identifier with a UID time stamp at the time of input of the UPAI in the MWD to provide the UID so as to distinguish two UIDs having duplicate unique potential attendee identifier portions;
receiving with a server on a first wireless channel communications from the MWD having associated therewith the UID;
registering the UID at the physical venue location of the event to define a registered attendee;
generating at the server a visual query;
displaying on a physical display at the event the visual query;
displaying on the MWD response indicators;
inputting, by a user of the MWD, a response via selection of one of the MWD response indicators on the MWD;
receiving at the server from the registered attendee the selected response to the visual query over the first wireless channel; and
storing in a database on the server the received response in association with the displayed query and with the registered attendee.

2. The method of claim 1, wherein the event is a closed venue.

3. The method of claim 1, wherein the unique potential attendee identifier is a fixed location associated with the venue, each unique potential attendee identifier being associated with a different fixed location within the venue.

4. The method of claim 3, wherein the fixed location is a defined seat in a closed venue having a seat identifier as the location.

5. The method of claim 1, wherein creating the unique ID comprises:
  recognizing the MWD at a predetermined and fixed location within physical location of the event, and
  launching an application on the MWD followed by the step of prompting a user to input the unique potential attendee identifier into the MWD.

6. The method of claim 5, wherein recognizing the MWD comprises a scan of the MWD in the vicinity of the predetermined and fixed location.

7. The method of claim 1, wherein registering the UID comprises responding to a request for registration by transmitting the UID to a server over the first wireless channel.

8. The method of claim 1, wherein the response indicators comprise alphabetic symbols.

9. The method of claim 1, wherein the response indicators comprise numeric symbols.

10. The method of claim 1, wherein the response indicators comprise symbols of differing colors.

11. The method of claim 1, wherein receiving at the server the selected response includes receiving a timestamp associated with the response.

12. The method of claim 1, wherein receiving at the server the selected response includes receiving the response within a defined time window.

13. The method of claim 1, further comprising the steps of:
- associating the received response with the UID;
- creating a query ID (QID) associated with the displayed query;
- creating a response time stamp indicating the time at which the response was received by the server; and
- creating a data record for the UID, the data record including:
  - the UID;
  - the QID; and
  - the received response.

14. The method of claim 13, further comprising associating the received response with statistical information related to an attendee classification.

15. The method of claim 13, further comprising assigning the UID to a statistical category based on the received response and the displayed query.

16. The method of claim 13, further comprising grouping the UID with additional UIDs from which the server received additional selected responses, the additional responses stored in the database in association with the displayed query, resulting from additional attendees associated with the additional UIDs each selecting the same response indicator on one of additional MWDs.

17. The method of claim 13, wherein the UID data record also includes statistical information that is related to an attendee classification and that is based on the received response.

* * * * *